US010733388B2

(12) United States Patent
Park et al.

(10) Patent No.: US 10,733,388 B2
(45) Date of Patent: Aug. 4, 2020

(54) CONTENT PARTICIPATION TRANSLATION APPARATUS AND METHOD

(71) Applicant: NAVER WEBTOON CORPORATION, Seongnam-si (KR)

(72) Inventors: Soo Yeon Park, Seongnam-si (KR); Seung Hwan Kim, Seongnam-si (KR); Ju Han Lee, Seongnam-si (KR); Ji Hoon Ha, Seongnam-si (KR)

(73) Assignee: NAVER WEBTOON CORPORATION, Seongnam-si (KR)

( * ) Notice: Subject to any disclaimer, the term of this patent is extended or adjusted under 35 U.S.C. 154(b) by 0 days.

(21) Appl. No.: 14/952,331

(22) Filed: Nov. 25, 2015

(65) Prior Publication Data

US 2016/0147746 A1 May 26, 2016

(30) Foreign Application Priority Data

Nov. 26, 2014 (KR) .................. 10-2014-0166765
Nov. 26, 2014 (KR) .................. 10-2014-0166766
(Continued)

(51) Int. Cl.
*G06F 40/58* (2020.01)
*G06F 40/10* (2020.01)
(Continued)

(52) U.S. Cl.
CPC ............ *G06F 40/58* (2020.01); *G06F 3/0485* (2013.01); *G06F 16/5846* (2019.01);
(Continued)

(58) Field of Classification Search
CPC ......... G06F 17/289; G06F 17/21; G06F 17/28
(Continued)

(56) References Cited

U.S. PATENT DOCUMENTS 5,576,953 A 11/1996 Hugentobler
5,813,018 A 9/1998 Kaji
(Continued)

FOREIGN PATENT DOCUMENTS

CN 101136760 A 3/2008
CN 101207502 A 6/2008
(Continued)

OTHER PUBLICATIONS

Office Action issued in corresponding Taiwanese Patent Application No. 104139200, dated Nov. 23, 2016 (with translation).
(Continued)

*Primary Examiner* — Daniel C Washburn
*Assistant Examiner* — Oluwadamilola M Ogunbiyi
(74) *Attorney, Agent, or Firm* — Greer Burns & Crain Ltd.

(57) ABSTRACT

A content participation translation apparatus includes a content registration unit for registering an original of content data on a database, wherein text data and image data are stored separately in the original of the content data; a data selection unit for individually selecting text data and image data included in either the original of the content data or a translation of the content data in which a translation is added to the original of the content data; a translations editor providing unit for providing a user terminal with a translations editor including a content data display unit for displaying the text data and the image data and a text data editor unit in which a translation of the text data is input; and a content storage unit for receiving a second-language text from at least one user terminal via the translations editor, and storing the text data, the image data, and the received second-language text as a translation of the content data.

11 Claims, 18 Drawing Sheets

(30) Foreign Application Priority Data

| Nov. 26, 2014 | (KR) | 10-2014-0166767 |
| Nov. 27, 2014 | (KR) | 10-2014-0167799 |
| Nov. 27, 2014 | (KR) | 10-2014-0167800 |

(51) Int. Cl.

| G06F 40/40 | (2020.01) |
| G06F 40/51 | (2020.01) |
| G06F 40/166 | (2020.01) |
| G06F 40/106 | (2020.01) |
| G06F 3/0482 | (2013.01) |
| G06F 3/0485 | (2013.01) |
| G06F 16/583 | (2019.01) |

(52) U.S. Cl.
CPC ............ *G06F 40/10* (2020.01); *G06F 40/166* (2020.01); *G06F 40/40* (2020.01); *G06F 40/51* (2020.01); *G06F 3/0482* (2013.01); *G06F 40/106* (2020.01)

(58) Field of Classification Search
USPC .......................................................... 704/7
See application file for complete search history.

(56) References Cited

U.S. PATENT DOCUMENTS

| 6,061,646 | A | 5/2000 | Martino |
| 6,161,082 | A | 12/2000 | Goldberg |
| 6,912,694 | B1 | 6/2005 | Harrison et al. |
| 7,139,696 | B2 | 11/2006 | Tokieda et al. |
| 7,168,040 | B2 * | 1/2007 | Yamamoto ............ G06F 17/218 |
| | | | 715/234 |
| 7,512,712 | B2 * | 3/2009 | Kim .................. G06F 17/30905 |
| | | | 709/246 |
| 7,580,828 | B2 | 8/2009 | D'Agostini |
| 7,689,404 | B2 | 3/2010 | Khasin |
| 7,752,034 | B2 | 7/2010 | Brockett |
| 7,908,132 | B2 | 3/2011 | Brockett |
| 7,930,719 | B2 | 4/2011 | Ellis |
| 7,949,517 | B2 | 5/2011 | Eckert |
| 8,065,134 | B2 | 11/2011 | Naito |
| 8,069,030 | B2 | 11/2011 | Iso-Sipila |
| 8,069,031 | B2 | 11/2011 | Gelbman |
| 8,144,990 | B2 | 3/2012 | Englund et al. |
| 8,751,213 | B2 | 6/2014 | Wong et al. |
| 8,839,094 | B2 | 9/2014 | Pearson et al. |
| 9,087,045 | B2 | 7/2015 | Prakash et al. |
| 9,280,538 | B2 | 3/2016 | Lee |
| 9,497,152 | B2 * | 11/2016 | Caldwell ............. G06Q 10/107 |
| 9,535,906 | B2 | 1/2017 | Lee et al. |
| 9,547,644 | B2 | 1/2017 | Cuthbert et al. |
| 9,773,197 | B2 | 9/2017 | Englund et al. |
| 10,108,612 | B2 | 10/2018 | Lee et al. |
| 10,198,439 | B2 | 2/2019 | Cuthbert et al. |
| 2002/0007265 | A1 | 1/2002 | Yamada |
| 2002/0091738 | A1 * | 7/2002 | Rohrabaugh ......... G06F 9/4443 |
| | | | 715/249 |
| 2002/0165708 | A1 | 11/2002 | Kumhyr |
| 2003/0009320 | A1 | 1/2003 | Furuta |
| 2003/0040900 | A1 | 2/2003 | D'Agostini |
| 2003/0115552 | A1 * | 6/2003 | Jahnke ................. G06F 9/4448 |
| | | | 715/201 |
| 2003/0120478 | A1 | 6/2003 | Palmquist |
| 2003/0176995 | A1 | 9/2003 | Sukehiro |
| 2003/0182453 | A1 * | 9/2003 | Kim .................. G06F 17/30905 |
| | | | 709/246 |
| 2004/0044517 | A1 | 3/2004 | Palmquist |
| 2004/0122678 | A1 | 6/2004 | Rousseau |
| 2004/0167768 | A1 | 8/2004 | Travieso |
| 2004/0172257 | A1 | 9/2004 | Liqin |
| 2004/0243392 | A1 | 12/2004 | Chino |
| 2005/0021322 | A1 | 1/2005 | Richardson |
| 2005/0143136 | A1 * | 6/2005 | Lev .......................... H01L 29/06 |
| | | | 455/566 |
| 2005/0192095 | A1 | 9/2005 | Cheng |
| 2005/0210380 | A1 * | 9/2005 | Kramer ................ G06F 3/04845 |
| | | | 715/244 |
| 2005/0225030 | A1 | 10/2005 | Baldry |
| 2006/0116865 | A1 | 6/2006 | Cheng |
| 2006/0140513 | A1 | 6/2006 | Tran Xuan et al. |
| 2006/0217955 | A1 | 9/2006 | Nagao |
| 2006/0217956 | A1 * | 9/2006 | Nagao ................... G06F 17/241 |
| | | | 704/2 |
| 2006/0285748 | A1 * | 12/2006 | Tateno ................... G06F 17/275 |
| | | | 382/181 |
| 2007/0070443 | A1 | 3/2007 | Kim |
| 2007/0122792 | A1 | 5/2007 | Galley |
| 2007/0192680 | A1 * | 8/2007 | Morales ............... G06F 17/2288 |
| | | | 715/234 |
| 2007/0192685 | A1 * | 8/2007 | Morales ............... G06F 17/2288 |
| | | | 715/209 |
| 2007/0294076 | A1 | 12/2007 | Shore |
| 2008/0059481 | A1 * | 3/2008 | Kunimatsu .......... H04N 21/632 |
| 2008/0147378 | A1 | 6/2008 | Hall |
| 2008/0154779 | A1 | 6/2008 | Kunimatsu et al. |
| 2008/0172637 | A1 | 7/2008 | Chang et al. |
| 2008/0198270 | A1 * | 8/2008 | Hobbs .................... H04N 19/44 |
| | | | 348/708 |
| 2008/0233980 | A1 | 9/2008 | Englund et al. |
| 2008/0281578 | A1 * | 11/2008 | Kumaran ................ G06F 17/28 |
| | | | 704/2 |
| 2008/0300859 | A1 * | 12/2008 | Chen ......................... G06F 9/543 |
| | | | 704/7 |
| 2009/0048820 | A1 | 2/2009 | Buccella |
| 2009/0083024 | A1 | 3/2009 | Suzuki |
| 2009/0119091 | A1 | 5/2009 | Sarig |
| 2009/0204387 | A1 | 8/2009 | Okada |
| 2009/0210778 | A1 * | 8/2009 | Kulas .................... G06Q 10/107 |
| | | | 715/201 |
| 2010/0030549 | A1 | 2/2010 | Lee et al. |
| 2010/0082330 | A1 | 4/2010 | Ankur et al. |
| 2010/0142806 | A1 * | 6/2010 | Malik .................. H04N 1/40062 |
| | | | 382/164 |
| 2010/0142820 | A1 * | 6/2010 | Malik ......................... G06K 9/38 |
| | | | 382/176 |
| 2010/0161628 | A1 * | 6/2010 | Bookman ............. G06F 17/3061 |
| | | | 707/755 |
| 2010/0311030 | A1 | 12/2010 | He |
| 2011/0097693 | A1 | 4/2011 | Crawford |
| 2011/0239119 | A1 | 9/2011 | Phillips et al. |
| 2012/0141959 | A1 | 6/2012 | von Ahn Arellano |
| 2012/0163668 | A1 | 6/2012 | Englund et al. |
| 2012/0240039 | A1 | 9/2012 | Walker et al. |
| 2012/0281017 | A1 * | 11/2012 | Seegers .................... G01C 21/20 |
| | | | 345/629 |
| 2012/0284635 | A1 * | 11/2012 | Sitrick ................. G06Q 10/101 |
| | | | 715/751 |
| 2013/0019173 | A1 | 1/2013 | Kotler et al. |
| 2013/0103383 | A1 | 4/2013 | Du et al. |
| 2013/0104016 | A1 * | 4/2013 | Nonaka ..................... G06F 17/00 |
| | | | 715/204 |
| 2013/0124185 | A1 | 5/2013 | Sarr et al. |
| 2013/0124978 | A1 | 5/2013 | Horns et al. |
| 2013/0124980 | A1 * | 5/2013 | Hudson ................... G06F 17/21 |
| | | | 715/243 |
| 2013/0238995 | A1 * | 9/2013 | Polack ................... G11B 27/034 |
| | | | 715/716 |
| 2013/0253900 | A1 | 9/2013 | Escobedo |
| 2013/0282376 | A1 * | 10/2013 | Nonaka ..................... G10L 13/00 |
| | | | 704/260 |
| 2013/0283157 | A1 | 10/2013 | Ebata |
| 2013/0307992 | A1 * | 11/2013 | Erlandsson ....... G06F 17/30265 |
| | | | 348/164 |
| 2013/0326341 | A1 * | 12/2013 | Nonaka ..................... G06T 11/60 |
| | | | 715/246 |
| 2013/0339870 | A1 | 12/2013 | Tandra Sishtla et al. |
| 2014/0016151 | A1 * | 1/2014 | Malik ....................... G09G 5/026 |
| | | | 358/1.13 |

(56) References Cited

U.S. PATENT DOCUMENTS

| | | | |
|---|---|---|---|
| 2014/0081619 A1* | 3/2014 | Solntseva | G06F 40/58 704/3 |
| 2014/0122054 A1 | 5/2014 | Takano et al. | |
| 2014/0143661 A1 | 5/2014 | Carreno-Fuentes et al. | |
| 2014/0164955 A1 | 6/2014 | Thiruvidam et al. | |
| 2014/0172408 A1 | 6/2014 | Vukosavljevic et al. | |
| 2014/0337008 A1* | 11/2014 | Morimoto | G06K 9/6807 704/3 |
| 2015/0010234 A1* | 1/2015 | Daisy | G06T 15/205 382/167 |
| 2015/0100301 A1* | 4/2015 | Phadke | G06F 17/2836 704/4 |
| 2015/0134318 A1 | 5/2015 | Cuthbert et al. | |
| 2015/0134323 A1 | 5/2015 | Cuthbert et al. | |
| 2015/0142876 A1* | 5/2015 | Chakravarthy | G06Q 10/101 709/203 |
| 2015/0234811 A1 | 8/2015 | Bareket et al. | |
| 2015/0234812 A1* | 8/2015 | Vukosavljevic | G06K 9/3283 704/2 |
| 2015/0248777 A1* | 9/2015 | Konishi | G06F 17/289 345/441 |
| 2015/0302004 A1 | 10/2015 | Lee | |
| 2015/0309997 A1 | 10/2015 | Lee et al. | |
| 2015/0339268 A1* | 11/2015 | Bednarz, Jr. | G06F 16/986 715/248 |
| 2015/0379382 A1* | 12/2015 | Mizoguchi | G06F 3/12 358/1.15 |
| 2016/0147724 A1 | 5/2016 | Park | |
| 2016/0147742 A1 | 5/2016 | Park | |
| 2016/0147746 A1 | 5/2016 | Park | |
| 2016/0283228 A1* | 9/2016 | Sullivan | G06F 8/71 |
| 2016/0328394 A1 | 11/2016 | Cuthbert et al. | |
| 2017/0060853 A1 | 3/2017 | Lee et al. | |
| 2017/0351665 A1 | 12/2017 | Kim et al. | |
| 2019/0163748 A1 | 5/2019 | Cuthbert et al. | |

FOREIGN PATENT DOCUMENTS

| | | | |
|---|---|---|---|
| CN | 101248432 A | | 8/2008 |
| CN | 102075509 A | | 5/2011 |
| CN | 102388383 A | | 3/2012 |
| CN | 103339622 A | | 10/2013 |
| CN | 1033483338 A | | 10/2013 |
| CN | 104899586 A | * | 9/2015 |
| JP | S-61-241866 A | | 10/1986 |
| JP | 07-160720 | | 6/1995 |
| JP | 2001-350746 | | 12/2001 |
| JP | 2005-141490 | | 6/2005 |
| JP | 2005-332320 A | | 12/2005 |
| JP | 2008-84286 | | 4/2008 |
| JP | 2008-217696 | | 9/2008 |
| JP | 2009-053761 | | 3/2009 |
| JP | 2010-517171 | | 5/2010 |
| JP | 2011-507079 | | 3/2011 |
| JP | 2013-15876 A | | 1/2013 |
| JP | 2013-20559 | | 1/2013 |
| JP | 2013-020559 A | | 1/2013 |
| TW | 525080 | | 7/1990 |
| TW | 1242745 | | 11/2005 |
| WO | 2007024609 A2 | | 3/2007 |
| WO | WO 2007/069343 A1 | | 6/2007 |

OTHER PUBLICATIONS

Office Action issued in corresponding Japanese Patent Application No. 2015-228749, dated Nov. 29, 2016.
Extended European search report dated Jan. 4, 2017 of the European patent application No. 15196320.4.
Mogmo Inc.: "Comics translation service", Internet archive record of Mogmo's webpage, Nov. 3, 2012 (Nov. 3, 2013), XP055330889, Retrieved from the Internet: URL:https:f/web.archive.orgjweb/20121103212228id /http://mogmo.comjsolutionsjpublishersjtranslation/ [retrieved on Dec. 21, 2016] * the whole document *.
Mogmo Inc.: "Comics translation service—Image 1", Image 1 on Mogmo's webpage, Dec. 21, 2016 (Dec. 21, 2016), XP055331049, Retrieved from the Internet: URL:http://mogmo.com/imagesjcontent/transl ator-1.png [retrieved on Dec. 21, 2016] * the whole document *.
Mogmo Inc.: "Comics translation service—Image 2", Image 2 on Mogmo's webpage, Dec. 21, 2016 (Dec. 21, 2016), XP055331051, Retrieved from the Internet: URL:http://mogmo.com/imagesjcontent/translator-2.png [retrieved on Dec. 21, 2016] * the whole document*.
Mogmo Inc.: "Comics translation service—Image 3", Image 3 on Mogmo's webpage, Dec. 21, 2016 (Dec. 21, 2016), XP055331052, Retrieved from the Internet: URL:http://mogmo.com/imagesjcontent/transl ator-3.jpg [retrieved on Dec. 21, 2016] * the whole document *.
Mogmo Inc.: "Comics translation service—Image 4", Image 4 on Mogmo's webpage, Dec. 21, 2016 (Dec. 21, 2016), XP055331054, Retrieved from the Internet: URL:http://mogmo.com/imagesfcontent/transl ator-4.png [retrieved on Dec. 21, 2016] * the whole document *.
Mogmo Inc.: "Comics translation service—Image 5", Image 5 on Mogmo's webpage, Dec. 21, 2016 (Dec. 21, 2016), XP055331055, Retrieved from the Internet: URL:http://mogmo.com/imagesjcontent/transl ator-5.png [retrieved on Dec. 21, 2016] * the whole document*.
Office Action issued in corresponding Japanese Patent Application No. 2015-228717, dated Jul. 4, 2017.
Final Rejection issued in corresponding Japanese Patent Application No. 2015-228749, dated Jul. 11, 2017.
Office Action issued corresponding Taiwanese Patent Application No. 104139191, dated Nov. 16, 2016.
Extended European search report issued in European patent application No. 15196310.5, dated Jan. 4, 2017.
First Office Action issued in corresponding Japanese patent application No. 2015-229725, dated Jan. 10, 2017.
IEICE Technical Report; vol. 113, No. 197; Information-Based Induction Sciences and Machine Learning; Sep. 2-3, 2013; pp. 1-11.
Office Action issued in corresponding Japanese Patent App. No. 2015-228717, dated Nov. 22, 2016.
European search report issued in European Patent App. No. 15196316.2, dated Jan. 4, 2017.
Office Action issued in corresponding Japanese Patent App. No. 2015-228715, dated Oct. 11, 2016.
Extended European search report dated Jan. 4, 2017 of the European patent application No. 15196318.8.
U.S. Appl. No. 14/952,197, filed Nov. 25, 2015.
U.S. Appl. No. 14/952,278, filed Nov. 25, 2015.
U.S. Appl. No. 14/951,960, filed Nov. 25, 2015.
First Office Action issued in corresponding Chinese Patent Application No. 201510845474.0 dated Nov. 6, 2017.
First Office Action issued in corresponding Chinese Patent Application No. 201510846437.1 dated Nov. 6, 2017.
First Office Action issued in corresponding Chinese Patent Application No. 201510846595.7 dated Nov. 27, 2017.
First Office Action issued in corresponding Chinese Patent Application No. 201510845604.0 dated Nov. 14, 2017.
2nd Office Action issued in corresponding Chinese Patent Application No. 201510845604.0 dated Jul. 9, 2018.
"Comics translation service", mogmo.com; <https://web.archive.org/web/20100726004402/http://mogmo.com:80//solutions/publishers/translation>.
2nd Office Action issued in co-pending Chinese Patent Application No. 201510846437.1 dated Jul. 2, 2018.
2nd Office Action issued in co-pending Chinese Patent Application No. 201510845474.0 dated Jul. 6, 2018.
Office action issued in related U.S. Appl. No. 14/951,960, dated Jun. 25, 2019.
Office action issued in related U.S. Appl. No. 14/952,197, dated Jul. 1, 2019.

* cited by examiner

CONTENT PARTICIPATION TRANSLATION APPARATUS AND METHOD

CROSS-REFERENCE TO RELATED APPLICATIONS

This application claims the benefit of Korean Patent Application No. 10-2014-0166765, filed on Nov. 26, 2014, Korean Patent Application No. 10-2014-0166767, filed on Nov. 26, 2014, Korean Patent Application No. 10-2014-0166766, filed on Nov. 26, 2014, Korean Patent Application No. 10-2014-0167799, filed on Nov. 27, 2014, and Korean Patent Application No. 10-2014-0167800, filed on Nov. 27, 2014, in the Korean Intellectual Property Office, the disclosures of which are incorporated herein in their entirety by reference.

BACKGROUND

1. Field

One or more exemplary embodiments of the present invention relate to a content participation translation apparatus and a content participation translation method using the same, and more particularly, to a content participation translation apparatus capable of enabling a plurality of users to edit the text contained in content provided in one language, such as in a cartoon, into other languages, so that the cartoon may be translated into many languages through users' participation, and a content participation translation method using the same.

2. Description of the Related Art

A cartoon is a picture intended to satirize or criticize life or society by exaggerating or omitting the features of an object using humor, caricature, satire, etc. Cartoons are classified into various fields, e.g., a romance cartoon, a martial arts cartoon, an action cartoon, a comic cartoon, a sports cartoon, a science fiction (SF) cartoon, etc., according to the contents thereof. A cartoon may show human complex attitudes using a visual system of pictures (images) and characters (text) and is thus more effective to draw the attention of readers than a general book only containing characters.

Recently, with the advancement in communication technology, cartoons have been provided not only through cartoon books but also via the Internet or the like. When a cartoon is provided via the Internet or the like, the cartoon may be provided according to a reader's language group by translating the characters contained therein into the languages of various countries.

Since both the pictures and characters contained in a cartoon provided via the Internet or the like are stored as images, the characters should be deleted using an image editing program and a result of translating the characters should be input and transformed into cartoon images together with the pictures, so as to make a translation of the cartoon.

Information disclosed in this Background section was already known to the inventors before achieving the inventive concept or is technical information acquired in the process of achieving the inventive concept. Therefore, it may contain information that does not form the prior art that is already known to the public in this country.

SUMMARY

One or more exemplary embodiments of the present invention include a content participation translation apparatus capable of enabling a plurality of users to edit the text contained in a cartoon provided in one language into other languages, so that the cartoon may be translated into many languages through users' participation, and a content participation translation method using the same.

One or more exemplary embodiments include a content participation translation apparatus capable of providing a high-quality translation by encouraging a plurality of users to participate in a translation process, and a content participation translation method using the same.

One or more exemplary embodiments include a content participation translation apparatus capable of reflecting and displaying a second-language text in a content data display unit in real time when a user inputs the second-language text to a translations editor, so that the user may check how a translation that he or she inputs is reflected and displayed in image data and thus input a translation that is most appropriate for an image, and a content participation translation method using the same.

One or more exemplary embodiments include a content participation translation apparatus capable of evaluating users who participate in a translation process in various ways and providing a credit to a translator who receives a favorable evaluation result, so that users may participate more actively and voluntarily in translating, the quality of a translation may be improved using such a translation system, and professional translators may be trained, and a content participation translation method using the same.

Additional aspects will be set forth in part in the description which follows and, in part, will be apparent from the description, or may be learned by practice of the presented embodiments.

According to one or more exemplary embodiments, a content participation translation apparatus includes a content registration unit for registering an original of content data on a database, wherein text data and image data are stored separately in the original of the content data; a data selection unit for individually selecting the text data and image data included in either the original of the content data or a translation of the content data in which a translation is added to the original of the content data; a translations editor providing unit for providing a translations editor to a user terminal, the translations editor including a content data display unit for displaying the text data and the image data and a text data editor unit in which a translation of the text data is input; and a content storage unit for receiving a representative image and a second-language text input from at least one user terminal via the translations editor, and storing the text data, the image data, and the received second-language text as a translation of the content data, wherein the representative image comprises an image included in a portion of a translation created by each user.

According to one or more exemplary embodiments, a content participation translation method comprises registering an original of content data with a content participation translation apparatus, performed by a content registration unit; individually selecting text data and image data included in either the original of the content data or a translation of the content data in which a translation is added to the original of the content data, performed by a data selection unit; providing a translations editor to a user terminal, performed by a translations editor providing unit, wherein the translations editor is configured to display the text data and the image data and to input a translation of the text data; and receiving a representative image and a second-language text from at least one user terminal via the translations editor, and storing the text data, the image data, and the received second-language text as a translation of the content data, performed by a content storage unit, wherein the representative image comprises an image included in a portion of a translation created by each user.

According to one or more exemplary embodiments, there is provided a computer program stored in a recording medium to perform the methods using a computer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
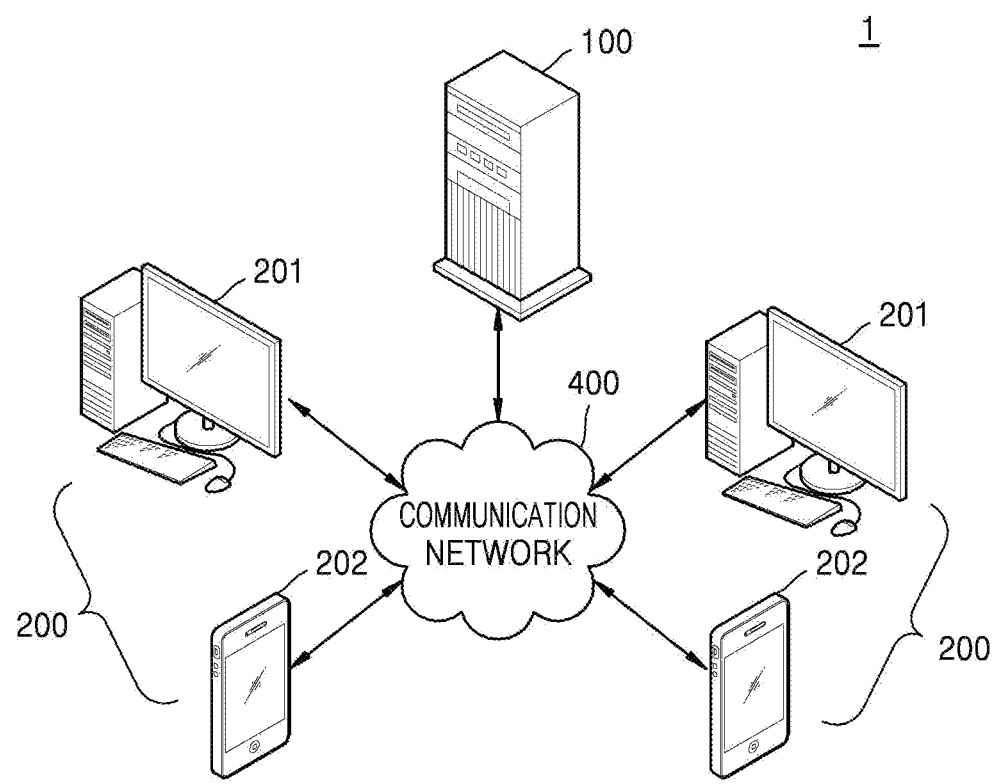
FIG. 1 is a diagram illustrating the structure of a content participation translation system according to an exemplary embodiment.

Reference will now be made in detail to embodiments of the present invention, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description. In the following exemplary embodiments, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. As used herein, the singular forms 'a', 'an' and 'the' are intended to include the plural forms as well, unless the context clearly indicates otherwise. It will be further understood that the terms 'comprise' and/or 'comprising,' when used in this specification, specify the presence of stated features, integers, steps, operations, elements, and/or components, but do not preclude the presence or addition of one or more other features, integers, steps, operations, elements, components, and/or groups thereof. In the drawings, lengths and sizes of layers and regions may be exaggerated for clarity. For example, the sizes and thicknesses of layers and regions illustrated in the drawings are arbitrarily illustrated for convenience of explanation and thus exemplary embodiments are not limited thereto.

As used herein, the term 'and/or' includes any and all combinations of one or more of the associated listed items. Expressions such as 'at least one of,' when preceding a list of elements, modify the entire list of elements and do not modify the individual elements of the list.

FIG. 1 is a diagram illustrating the structure of a content participation translation system 1 according to an exemplary embodiment.

Referring to FIG. 1, the content participation translation system 1 according to an exemplary embodiment includes a content participation translation apparatus 100 and user terminals 200. The content participation translation system 1 further includes a communication network 400 that connects the user terminals 200 and the content participation translation apparatus 100 to one another.

The content participation translation apparatus 100 according to an exemplary embodiment is configured to, for example, provide the means to perform a cartoon participation translation to the user terminal 200 such that a plurality of users may edit the text of a cartoon provided in one language into other languages, thereby translating the cartoon in many languages through users' participation in a translation process. In other words, the content participation translation apparatus 100 can be a translations editor providing apparatus providing the means to perform a cartoon participation translation to the user terminal 200.

Here, the content participation translation apparatus 100 according to an exemplary embodiment may be a server that provides a portal service. Although FIG. 1 illustrates one content participation translation apparatus 100, additional content participation translation apparatuses may be provided according to traffic or the amount of data.

The content participation translation apparatus 100 may provide the user terminal 200 with not only the means to perform a cartoon participation translation but also general search services and various other services for increasing user convenience. That is, the content participation translation apparatus 100 according to an exemplary embodiment may provide various services, e.g., a search service, an email service, a blog service, a social network service, a news service, shopping information, etc.

Otherwise, the content participation translation apparatus 100 may be a server that is connected to a portal service providing server that provides portal services such as a search service, an email service, a news service, shopping information, etc. and that provides the user terminal 200 requesting information regarding a portal service with the means to perform a cartoon participation translation provided by the portal service. Here, the content participation translation apparatus 100 and a portal service providing server (not shown) may be physically separated servers or may be conceptually separated servers but are actually the same server.

The user terminals 200 are preferably communication terminals via which a web service may be used in a wire/wireless communication environment. Here, the user terminal 200 may be a personal computer (PC) 201 or a portable terminal 202 belonging to a user. Although FIG. 1 illustrates the portable terminal 202 as a smart phone, the inventive concept is not limited thereto, and any terminal in which an application including a web browsing function is installed may be used without limitation as described above.

More specifically, the user terminals 200 may include, but are not limited to, computers (e.g., desktop computers, laptop computers, tablet PCs, etc.), media computing platforms (e.g., cables, satellites, set-top boxes, digital video recorders, etc.), handheld computing devices (e.g., personal digital assistants (PDAs), email clients, etc.), arbitrary forms of a mobile phone, other types of computing or communication platforms, etc.

The communication network 400 connects the user terminals 200 and the content participation translation apparatus 100 with one another. That is, the communication network 400 should be understood as a communication network that provides an access path via which the user terminals 200 may access the content participation translation apparatus 100 and transmits data to or receives data from the content participation translation apparatus 100. The communication network 400 may include, for example, cable networks such as local area networks (LANs), wide area networks (WANs), metropolitan area networks (MANs), integrated service digital networks (ISDNs), etc. or wireless networks such as wireless LANs, code division multiple access (CDMA), Bluetooth, satellite communication, etc. but exemplary embodiments are not limited thereto.

Figure 2:
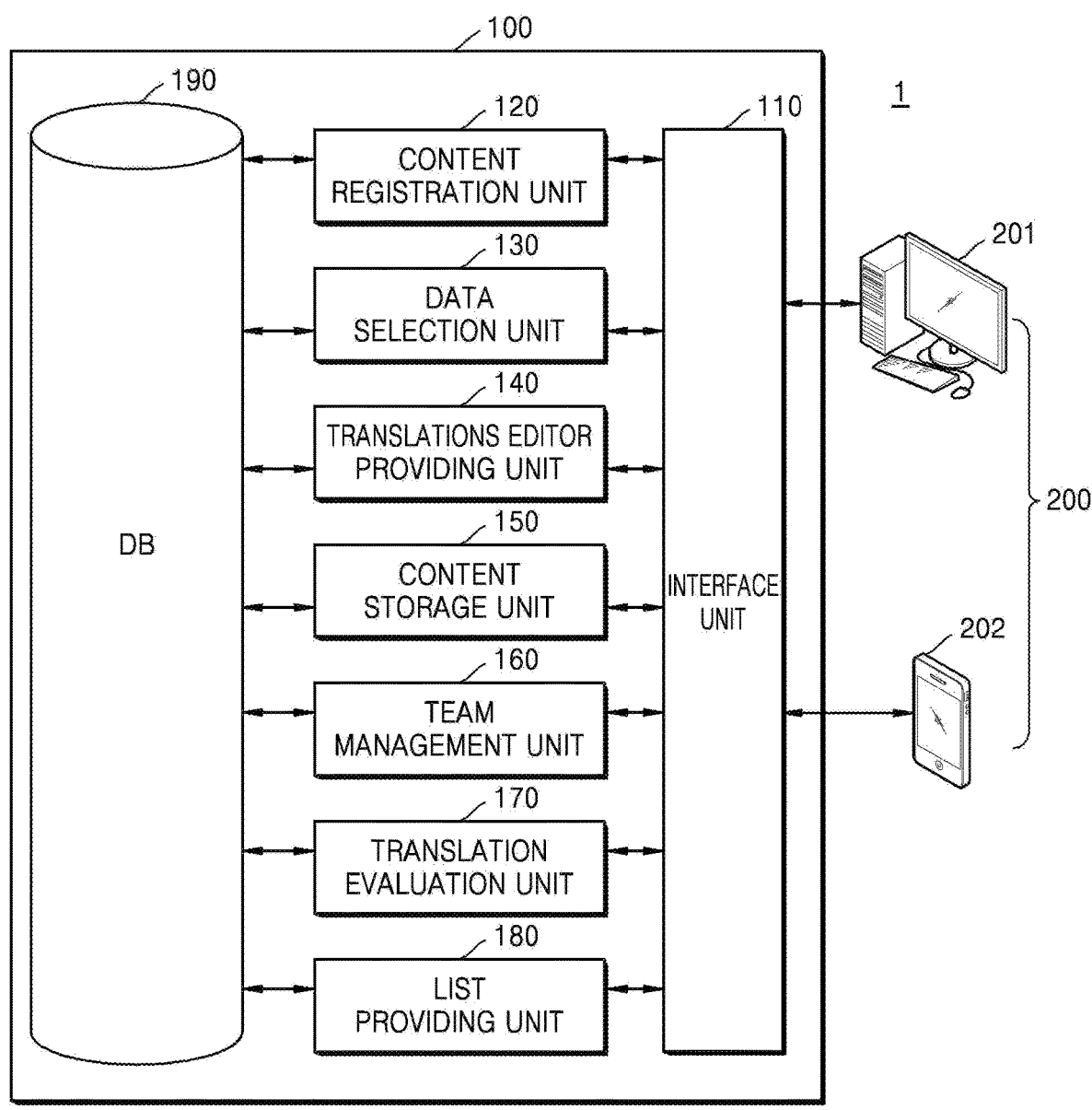
FIG. 2 is a block diagram of the internal structure of the content participation translation apparatus of FIG. 1.

FIG. 2 is a block diagram of the internal structure of the content participation translation apparatus 100 of FIG. 1.

Referring to FIG. 2, the content participation translation apparatus 100 of the content participation translation system 1 according to an exemplary embodiment includes an interface unit 110, a content registration unit 120, a data selection unit 130, a translations editor providing unit 140, a content storage unit 150, and a database 190. The content participation translation apparatus 100 may further include a team management unit 160, a translation evaluation unit 170, a list providing unit 180. The units 120-180 of the content participation translation apparatus 100 may each be a software program for performing the corresponding functions described below. Each of the units 120-180 may be run on a processor dedicated to the operation of the corresponding unit, or the functions of multiple units may be performed on a shared processor or computer provided in the content participation translation apparatus 100.

In detail, the interface unit 110 provides a communication interface for providing, as packet data, a signal exchanged between the content participation translation apparatus 100 and the user terminal 200 while interoperating with the communication network 400. Furthermore, the interface unit 110 may be configured to receive a request to provide a web page from the user terminal 200. Here, the request to provide the web page, which is received from the user terminal 200, may include, for example, a request to provide any of various types of web pages, e.g., a request to provide a main page of a portal site or a specific page, a request to provide a cartoon list page, a request to provide a translations editor, etc.

The content registration unit 120 is configured to register an original of cartoon data, which is a translation target, on the database 190 of the content participation translation apparatus 100. In this case, the content registration unit 120 may directly receive the original of the cartoon data via an input/output (I/O) unit (not shown) included in the content participation translation apparatus 100 and register the original of the cartoon data on the database 190, or may receive the original of the cartoon data from the outside (e.g., a cartoonist) via the communication network 400 and register the original of the cartoon data on the database 190. In this case, text data and image data may be stored separately in the registered original of the cartoon data. In general, the text data contained in the original of the cartoon data includes only a first-language text.

The data selection unit 130 is configured to individually select text data and image data contained in the registered original of the cartoon data or a translation of the cartoon data in which a translation is added to the original of the cartoon data. In detail, since both the pictures and characters contained in existing cartoons provided via the Internet are stored as images, the characters included in a cartoon should be deleted using an image editing program and a result of translating the characters should be input and transformed into cartoon images, together with the pictures included in the cartoon to make a translation of a cartoon. Otherwise, the characters may be extracted from the cartoon by using a character recognition program. However, a character recognition ratio of the character recognition program is not high, and is very low, particularly when various effects are added to the text of the cartoon.

To solve this problem, the content participation translation apparatus 100 of the content participation translation system 1 according to an exemplary embodiment is configured to use, as original data, cartoon data in text data and image data that are stored separately, so that the text data and the image data may be easily and exactly separated without having to additionally use an image editing program or a character recognition program.

In detail, a cartoon authoring tool may be configured to separately store, in different layers, image data and text data generated when a cartoonist creates an original of cartoon data. Here, each of unit texts that constitute the text data may contain location information regarding the location thereof in the image data.

However, when such an original of cartoon data is published via the Internet, the original of the cartoon data is transformed into and published as a general image file such as a JPG file due to the amount thereof. After the original of the cartoon data is transformed into a general image file, text data and image data thereof are stored such that they are not separated from each other.

Thus, the content participation translation apparatus 100 of the content participation translation system 1 according to an exemplary embodiment may receive an original of cartoon data in which text data and image data are separately stored in different layers from a cartoonist and apply the original of the cartoon data to a participation translation system. Thus, a cartoon participation translation, in which text and images should be provided and edited separately, may be very easily and exactly realized.

In this case, the text data may include at least one unit text (e.g., one sentence, one paragraph, one dialogue, etc.), and each of the at least one unit text may be stored in a different layer. In detail, when an original cartoon author creates an original of cartoon data, the original cartoon author may store one sentence, one paragraph, one dialogue, etc. as a separate unit text. For example, a cartoon original author may separately store a text included in one tooltip as one unit text. Unit texts that are stored separately by a cartoon original author may be also used as basic translation units in a participation translation.

In general, only a first-language text is included in an original of cartoon data. However, not only the first-language text but also at least one second-language text may be included in a translation of the cartoon data that is being translated or that is completely translated. Thus, the data selection unit 130 may select text data including both the first-language text and the second-language text separately from image data, and may also select the first-language text and the second-language text separately.

Although the data selection unit 130 is illustrated to be included in the content participation translation apparatus 100, exemplary embodiments are not limited thereto, and the data selection unit 130 may be included in the user terminal 200. In this case, when an original of cartoon data is transmitted directly to the user terminal 200 from the content participation translation apparatus 100, the user terminal 200 may individually select text data and image data included in the original of the cartoon data.

The translations editor providing unit 140 provides a translations editor to at least one user terminal 200, where it is displayed on a display panel or screen. In a translations editor 500a (see FIG. 5A), a cartoon data display unit 530 configured to display text data and image data and a text data editor unit 540 configured to input a translation in units of unit texts are provided in different regions. In detail, image data, and a first-language text or a second-language text included in text data are displayed on the cartoon data display unit 530. The translations editor 500a may provide a second-language text input unit 543 (see FIG. 5A) at close proximity to a first-language text display unit 542, in which a translation of a first-language text (which is included in an original of cartoon data) in a second language may be input, while displaying the first-language text on the first-language text display unit 542. Also, in the translations editor 500a, the first-language text display unit 542 and the second-language text input unit 543 are moved with the text data and image data when they are is scrolled on the cartoon data display unit 530. The translations editor 500a will be described in more detail below.

Referring back to FIG. 2, the content storage unit 150 receives image data, a first-language text, and a second-language text from the user terminal 200, merges and stores them in the database 190, as a translation of the cartoon data, a result of merging the image data, the first-language text, and the second-language text. Otherwise, the content storage unit 150 may receive only a second-language text from the user terminal 200, merge the second-language text with image data and a first-language text of an original of cartoon data stored beforehand, and store in the database 190, as a translation of the cartoon data, a result of merging the second-language text, the image data, and the first-language text. Otherwise, the content storage unit 150 may receive, from the user terminal 200, a translation of cartoon data generated beforehand by merging image data, a first-language text, and a second-language text, and store the translation of the cartoon data in the database 190.

The content participation translation system 1 according to an exemplary embodiment may be configured to provide a Wiki translation and a team translation simultaneously or selectively. Here, the term "Wiki translation" means a translation process in which any user may freely participate. That is, a Wiki translation should be understood as a translation process in which a plurality of users may participate to input, modify, or delete a translation of one cartoon. In this case, all translations input by the plurality of users may be stored or a translation of the cartoon may be updated to a lastly input translation. That is, a Wiki translation may be performed in various forms.

The term "team translation" means a translation process in which a right to participate in the translation process is assigned to only predetermined team members. That is, a team translation is the same as a Wiki translation in that a plurality of users may participate in the translation process but is different from a Wiki translation since a right to participate in the translation process is assigned to predetermined team members other than all users. Similarly, in a team translation, a plurality of team members may input, modify, or delete a translation of one cartoon. In this case, all translations input by the plurality of team members may be stored or a translation of the cartoon may be updated to a lastly input translation. That is, a team translation may be performed in various forms.

Here, the team management unit 160 may manage generation and deletion of a translation team having the right to participate in a translation process, joining and withdrawal of members of the translation team, and the like. Also, the team management unit 160 stores information regarding members and a manager belonging to each of the translation teams in the database 190, and assign a predetermined right to the members and the manager. That is, the team management unit 160 may allow only members of a specific translation team to access a translation that is being conducted by the specific translation team, and allow a manager to select the best translation among translations when the translations are input by a plurality of members or translators of one team.

The translation evaluation unit 170 conducts a predetermined evaluation on a user who participates in a translation process. That is, the translation evaluation unit 170 may evaluate each of the translators, based on the activities of each of the translators, e.g., quantitative numeral values such as the number of translated sentences, the number of times that each of the translators visit participation translation sites, the number of times that each of the translators view translations of other users, the number of followers, etc., and allocate a predetermined translation level to each of the translations according to an evaluation result. Furthermore, a predetermined credit may be given to a translator who receives a favorable evaluation result. For example, a grade may be assigned to a user who participates in a translation process, and the credit improves the grade of the user. As described above, since a user who participates in a translation process may be evaluated in various ways and a predetermined credit may be given to a translator who receives a favorable evaluation result according to an evaluation result, users may be induced to participate in a translation process more actively and voluntarily. Through the translation system described above, the quality of a translation may be improved and professional translators may be trained.

The list providing unit 180 extracts various lists, such as a cartoon list, a list of episodes of a cartoon, a translator list, a translation team list, etc., from the database 190 and provides the extracted lists to the user terminal 200.

Figure 3:
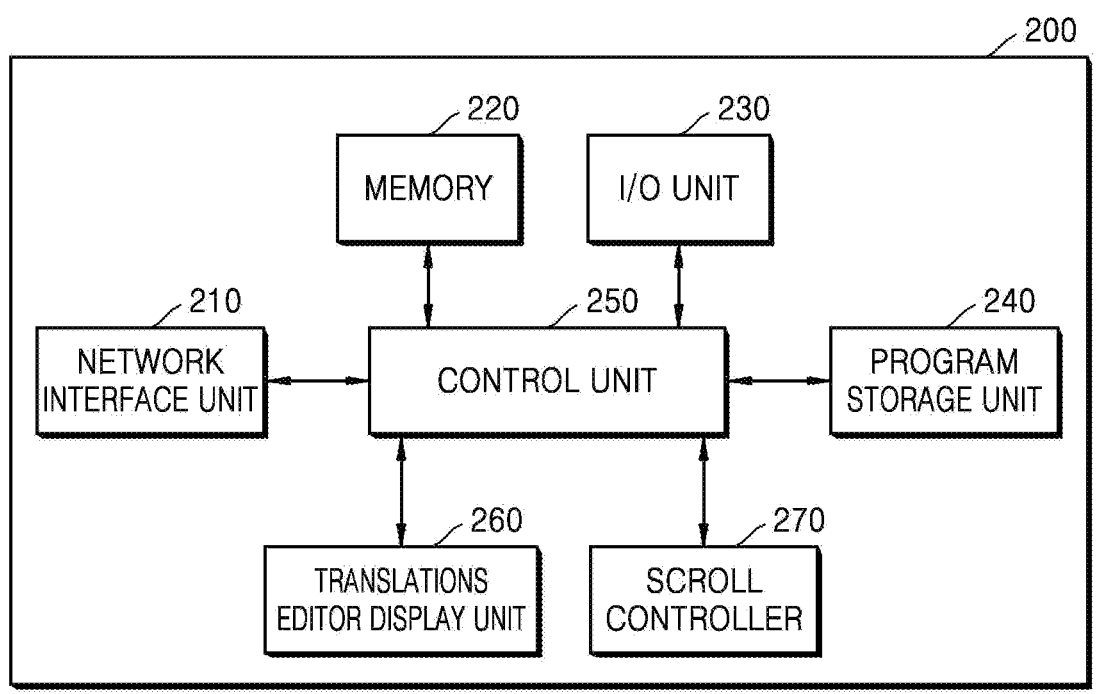
FIG. 3 is a block diagram of the internal structure of a user terminal of FIG. 1.

FIG. 3 is a block diagram of the internal structure of the user terminal 200 of FIG. 1.

Referring to FIG. 3, the user terminal 200 according to an exemplary embodiment includes a network interface unit 210, a memory 220, an I/O unit 230, a program storage unit 240, a control unit 250, a translations editor display unit 260 and a scroll controller 270.

In detail, the network interface unit 210 provides a communication interface for receiving cartoon data and a translations editor (such as the translations editor 500a shown in FIG. 5A) from the content participation translation apparatus 100 while interoperating with the communication network 400.

The memory 220 temporarily stores data processed by the control unit 250 or cartoon data transmitted to the user terminal 200.

The I/O unit 230 may be configured as a touch recognition display controller and another I/O controller. The touch recognition display controller provides an output interface and an input interface between a device and a user. The touch recognition display controller exchanges an electrical signal with the control unit 250. Also, the touch recognition display controller may display a visual output to a user, and the visual output may include a text, graphics, an image, a video, and a combination thereof. The other I/O controller may control an input to or an output from other peripheral devices such as power and a speaker and a microphone. The I/O unit 230 may be, for example, a display member such as an organic light-emitting display (OLED) or a liquid crystal display (LCD) having a touch recognition function.

The program storage unit 240 includes control software for receiving cartoon data and a translations editor from the content participation translation apparatus 100, displaying the cartoon data and the translations editor on the I/O unit 230 of the user terminal 200, receiving a translation, etc.

The control unit 250 is a type of central processing unit, and controls the entire operation of providing a cartoon participation translation service from the user terminal 200. That is, the control unit 250 drives the control software installed in the program storage unit 240, and controls the translations editor display unit 260 to provide various services, e.g., displaying cartoon data on the translations editor while displaying the translation editor on the I/O unit 230 of the user terminal 200.

The translations editor display unit 260 receives a translations editor from the content participation translation apparatus 100 and displays the translations editor on the user terminal 200. Also, as will be described below, the cartoon data display unit 530 and the text data editor unit 540 may be provided in the translations editor 500a of FIG. 5A, and the translations editor display unit 260 may display image data and text data of a cartoon on the cartoon data display unit 530 of FIG. 5A and provide a second-language text input unit while displaying a first-language text on the text data editor unit 540. The translations editor display unit 260 may be implemented as software program running on a dedicated processor to perform the operations described above. It may also be implemented in a shared processor provided in the user terminal 200 for performing other general functions associated with the user terminal. A scroll controller 270 controls one of the cartoon data display unit 530 and the text data editor unit 540 to be scrolled together with the other, according to a request to scroll the cartoon data display unit 530 or the text data editor unit 540.

In detail, in most cases, a cartoon (particularly, a webtoon, i.e., a cartoon content that is most actively consumed via the Internet) is created to be viewed in a vertical direction. Thus, since all image data of the cartoon is not displayed within one screen, the cartoon is generally created and viewed while scrolling is performed on the screen in an up or down direction. Thus, a scroll unit 533 of FIG. 5A may be formed on the cartoon data display unit 530, and the image data may be scrolled in an up or down direction when the scroll unit 533 is manipulated according to a user input.

In this case, for convenience of a user who makes a translation, when image data is scrolled on the cartoon data display unit 530, the scroll controller 270 may control the text data editor unit 540 to be moved along with the image data, so that unit text data corresponding to currently displayed image data may be displayed on the text data editor unit 540.

Also, when the text data editor unit 540 is scrolled, the scroll controller 270 may control the image data in the cartoon data display unit 530 to be moved along with the text data editor unit 540, so that the image data corresponding to currently displayed unit text data may be displayed on the cartoon data display unit 530.

In this case, each of unit texts that constitute text data may include location information of the location thereof in the image data.

Figure 5A:
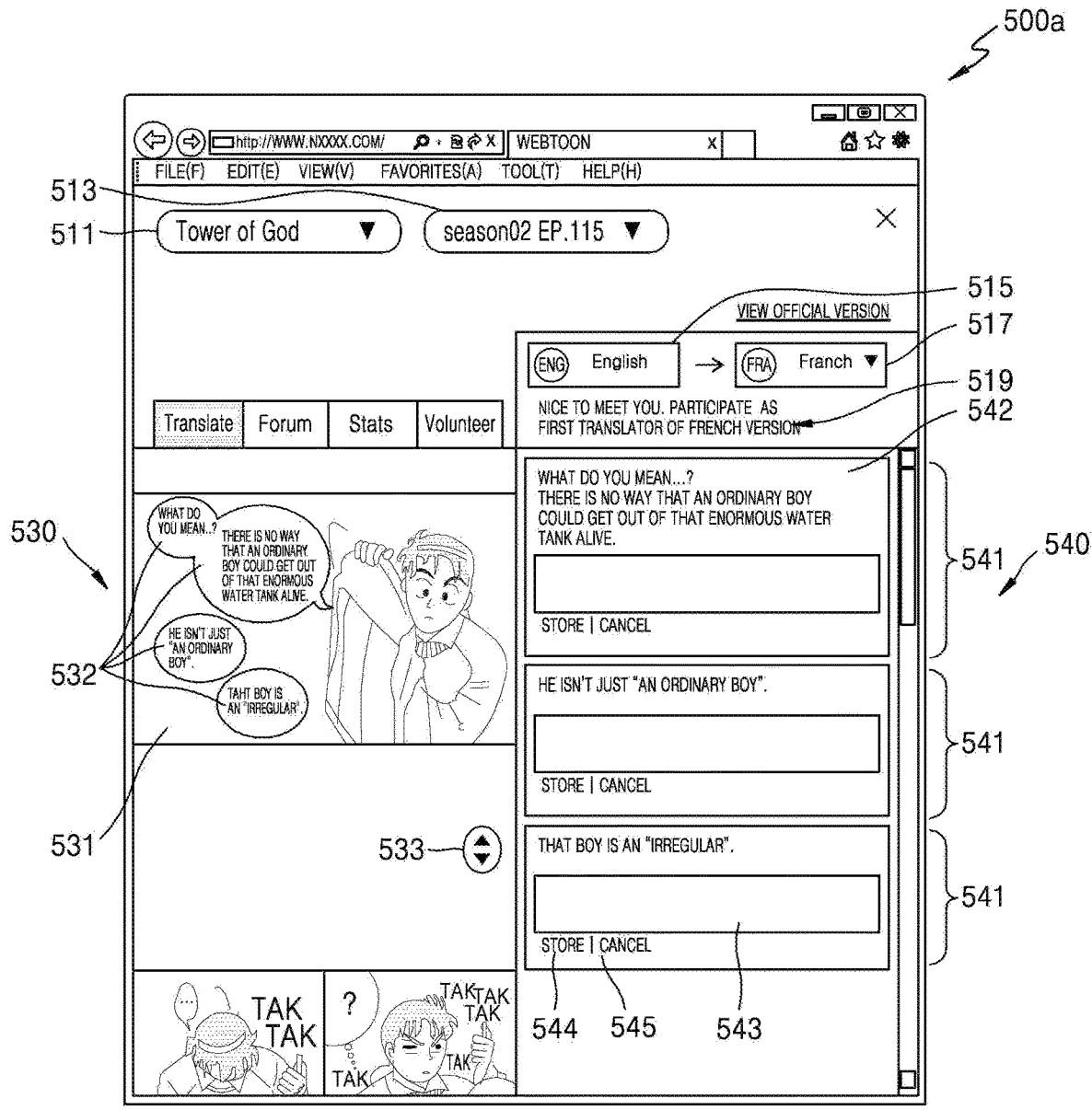
FIGS. 5A to 5C illustrate screens including a translations editor and displayed on a user terminal.

Thus, the translations editor display unit 260 may display a unit text editor unit 541 of FIG. 5A corresponding to each of text data display units 532 of the cartoon data display unit 530 at a side of each of the text data display units. Also, the scroll controller 270 may control the cartoon data display unit 530 and the text data editor unit 540 to be scrolled integrally. In other words, unit text editor units 541 of the text data editor unit 540 may be arranged to be synchronized with an image and text displayed on the cartoon data display unit 530, so that the cartoon data display unit 530 and the text data editor unit 540 may be scrolled integrally when scrolling is performed.

Otherwise, the translations editor display unit 260 may extract the location information from each of the unit texts, and the scroll controller 270 may control the unit text editor unit 541, which corresponds to a location at which image data is scrolled, moved, and currently displayed, to be displayed on the text data editor unit 540 when the cartoon data display unit 530 is scrolled. Otherwise, when the text data editor unit 540 is scrolled, the scroll controller 270 may control image data and text data, which correspond to a location at which the location text data editor unit 540 is scrolled, moved, and currently displayed, to be displayed on the cartoon data display unit 530. In other words, when scrolling is performed to scroll the cartoon data display unit 530 or the text data editor unit 540, location information of the other cartoon data display unit 530 or text data editor unit 540 may be calculated based on the location information of each of the unit texts and portions of the image data and the text data corresponding to the location information may be displayed.

As described above, according to an exemplary embodiment, a unit text editor unit 541 is provided alongside an image region displayed currently on a screen to be synchronized with the image region, so that a translation may be input with respect to the image region without having to additionally perform scrolling, thereby greatly improving the convenience of a translation process.

Figure 4:
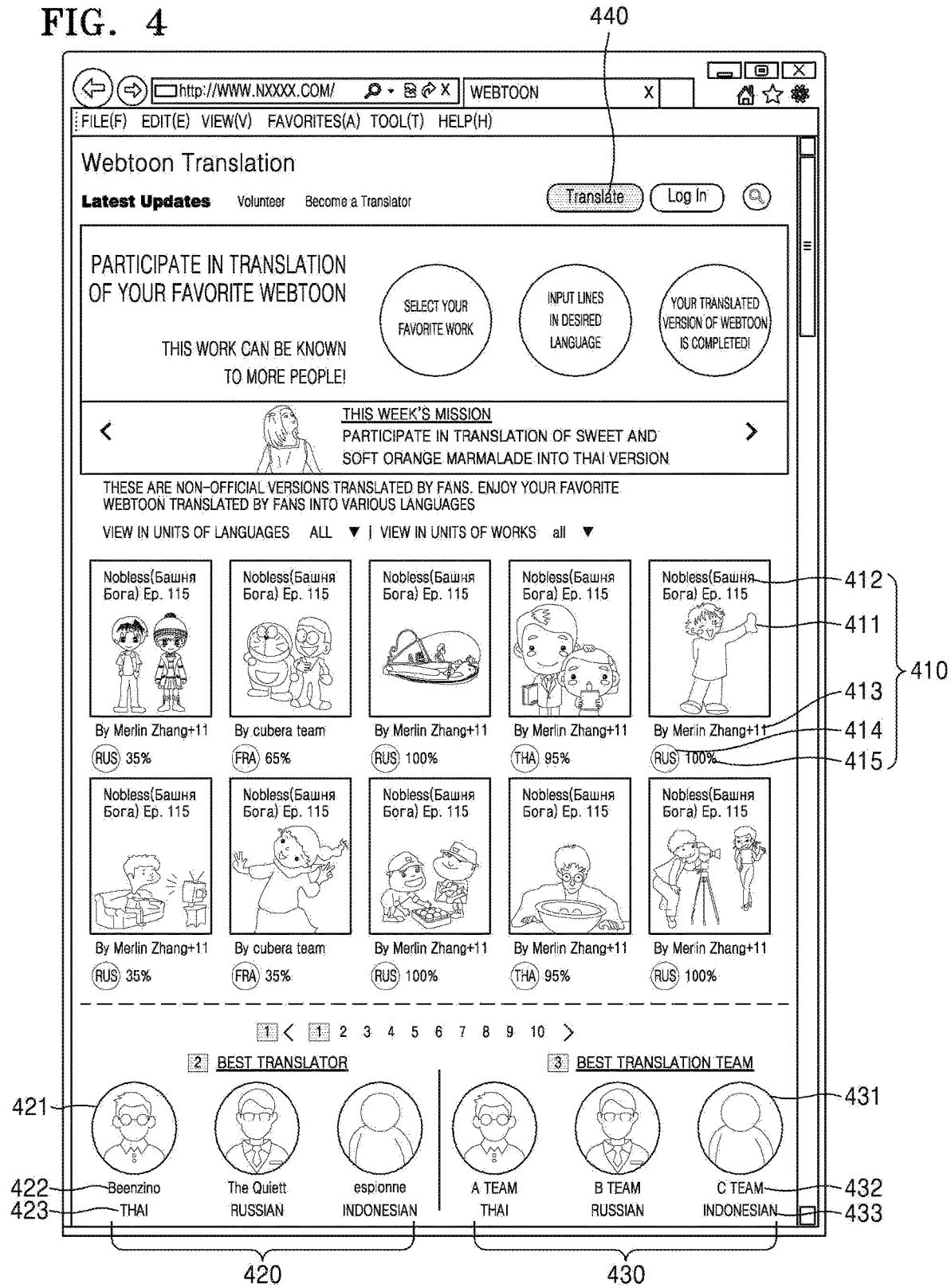
FIG. 4 illustrates a screen including a list of cartoons and displayed on a user terminal.

FIG. 4 illustrates a screen including a list of cartoons and displayed on a user terminal 200.

Referring to FIG. 4, a cartoon information display unit 410, a translator information display unit 420, and a translation team information display unit 430 are displayed on the user terminal 200.

In this case, a plurality of cartoon information display units 410 may be displayed, and may each include an image display unit 411, a title display unit 412, a translator display unit 413, a translation language display unit 414, and a translation progress display unit 415.

Here, the plurality of cartoon information display units 410 may be arranged and displayed in a descending order, starting from the one updated the latest, or in other various ways, e.g., according to the progress of a translation process, popularity, etc. Also, only cartoons, the progress of a translation process of which is at a predetermined level (e.g., 50%) or more, may be displayed on the cartoon information display unit 410. When information regarding a language of a user is registered, a cartoon translated in the registered language may be first displayed on the cartoon information display unit 410. Also, the version of an operating system (OS) language of a user terminal 200 may be checked, and a translated cartoon may be first displayed on the cartoon information display unit 410.

A representative image of a cartoon may be displayed on the image display unit 411.

The title of a cartoon may be displayed on the title display unit 412, and the number of an episode of the cartoon may be also displayed. For example, episode 115 of a cartoon entitled "Nobless" is displayed on the title display unit 412 illustrated in FIG. 4.

The name of a translator or a translation team may be displayed on the translator display unit 413. In the case of a Wiki version, the name of a person who has registered the largest number of translations for the episode 115 may be displayed as a translator. In the case of a team version, the name of a translation team may be displayed.

A language into which a translation is being done may be displayed on the translation language display unit 414. For example, when the cartoon is translated in Russian, characters "RUS" may be displayed. Otherwise, the language into which the cartoon is translated may be displayed in various ways, e.g., a color, a sign, etc.

The progress of translating an episode may be displayed on the translation progress display unit 415. In this case, the progress of translating the episode may be calculated using a formula of {(the number of translated sentences of the episode)/(the number of total sentences of the episode)}.

A plurality of translator information display units 420 may be displayed, and may each include an image display unit 421, a title display unit 422, and a translation language display unit 423. A representative image of a translator may be displayed on the image display unit 421. The name (or nickname) of the translator may be displayed on the title display unit 422. A language into which a translation is done may be displayed on the translation language display unit 423. Here, a translator who inputs the largest number of sentences for a predetermined time period may be displayed on the translator information display unit 420. Otherwise, translators may be arranged and displayed on various ways, e.g., according to the order of translated episodes, popularity, etc.

A plurality of translation team information display units 430 may be displayed, and may each include an image display unit 431, a title display unit 432, and a translation language display unit 433. A representative image of a translation team may be displayed on the image display unit 431. The name (or nickname) of the translation team may be displayed on the title display unit 432. A language in which a translation is being done may be displayed on the translation language display unit 433. Here, a translation team that inputs a largest number of translated sentences for a predetermined time period may be displayed on the translation team information display unit 430, or translation teams may be arranged and displayed in various ways, e.g., according to the order of translated episodes, popularity, etc.

Figure 5B:
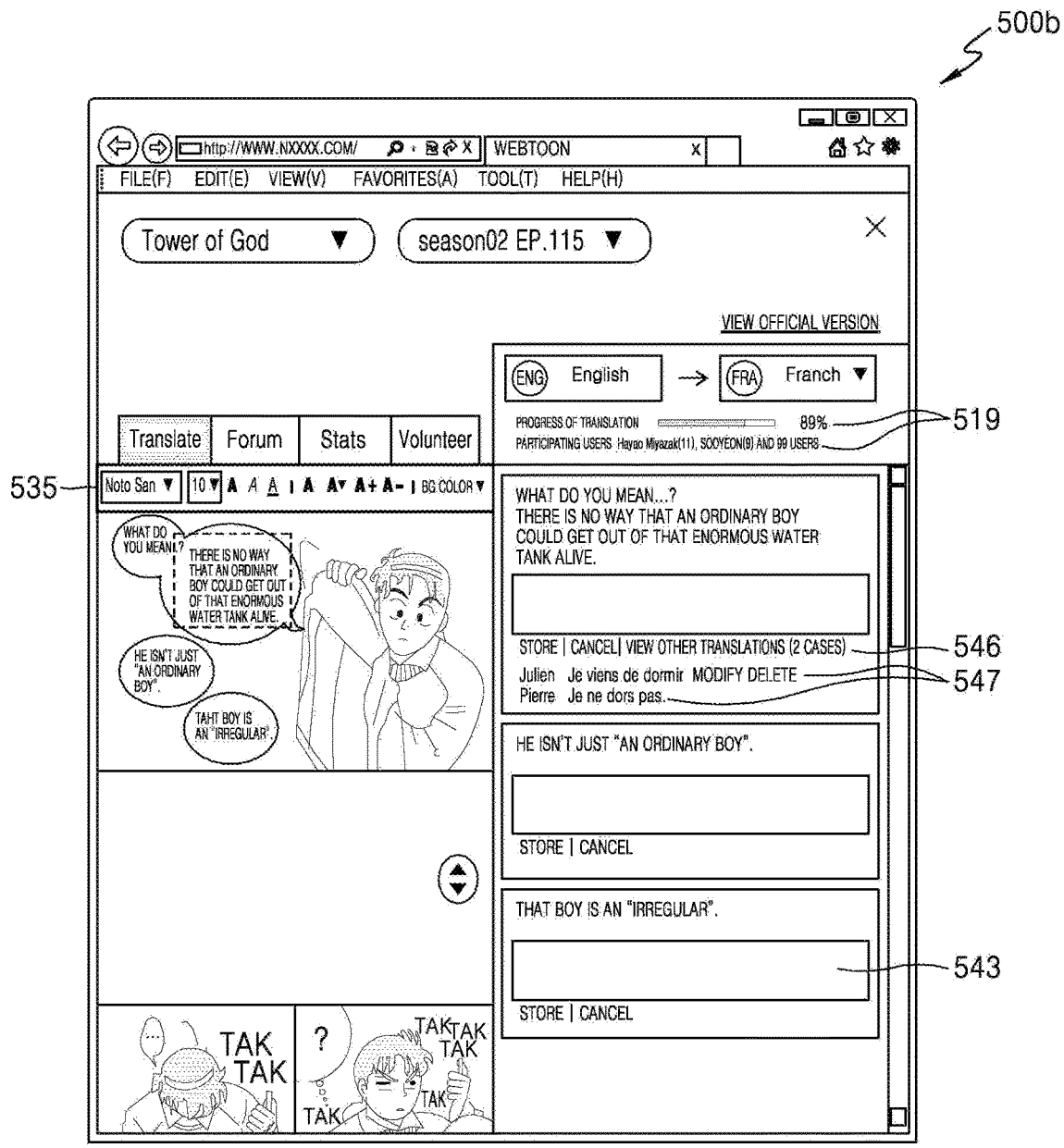
Figure 5C:
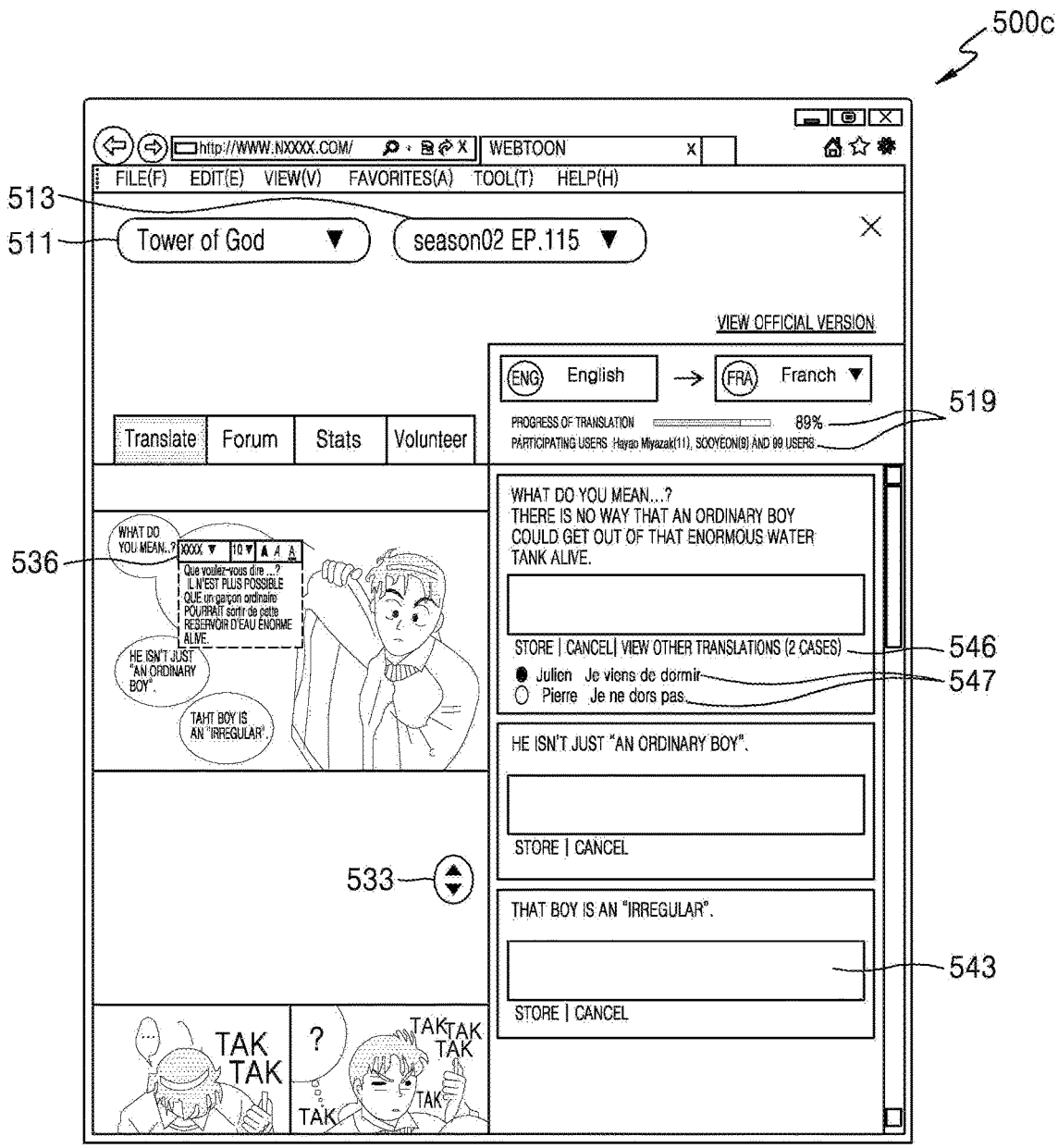

In FIG. 4, a translation participation request button 440 is displayed. When the translation participation request button 440 is selected according to a user input, a translations editor illustrated in FIG. 5A, 5B, or 5C is provided on the user terminal 200. The translations editor is described in detail below.

FIG. 5A illustrates a screen including a translations editor and displayed on a user terminal, in which a translation is first done into a language. FIGS. 5B and 5C illustrate screens including the translations editor and displayed on the user terminal, in which a translation is done into a language. Here, FIG. 5B illustrates a screen in which a font editor unit is applied to a whole text, and FIG. 5C illustrates a screen in which the font editor unit is applied to an individual unit text.

Referring to FIG. 5A, a translations editor 500*a* may be provided on the user terminal 200 of FIG. 3. A cartoon selection unit 511, an episode selection unit 513, a first-language selection unit 515, a second-language selection unit 517, a translation status display unit 519, a cartoon data display unit 530, and a text data editor unit 540 may be provided on the translations editor 500*a*.

A list of cartoons for which users may participate in a translation process is displayed on the cartoon selection unit 511, and a cartoon to be translated is selected from the list of cartoons according to a user input. The cartoon selection unit 511 may be provided as a select box, etc.

A list of episodes of the cartoon for which users may participate in a translation process thereof is displayed on the episode selection unit 513, and an episode to be translated is selected from the list of episodes according to a user input. The episode selection unit 513 may be provided as a select box, etc.

For example, a state in which users are participating in a translation process of episode 115 of season 2 of a cartoon entitled "Tower of God" is illustrated in FIGS. 5A-5C.

A list of first languages that are selectable is displayed on the first-language selection unit 515, and a first language is selected according to a user input. As described above, the first language may be a language in which text data included in an original of cartoon data updated by a cartoon original author, a system manager, etc. is prepared. The first-language selection unit 515 may be provided as a select box, etc.

A list of second languages that are selectable is displayed on the second-language selection unit 517, and a second language is selected according to a user input user. As described above, the second language is a target language in which a translation is to be done. Thus, the list of second languages is generally more diverse than the list of first languages displayed on the first-language selection unit 515. The second-language selection unit 517 may be provided as a select box, etc.

The progress of translating an episode of a specific season of a cartoon is displayed on the translation status display unit 519. Since FIG. 5A illustrates a case in which a translation is first done into a language, the progress of the translation process may not be displayed on the translation status display unit 519. Referring to FIGS. 5B and 5C, the progress of translating the episode 115 of season 2 of the cartoon may be displayed on the translation status display unit 519. Furthermore, the names and total number of users who participate in a translation of the episode 115 may be additionally displayed on the translation status display unit 519.

The cartoon data display unit 530 includes an image data display unit 531, a text data display unit 532, and the scroll unit 533. The cartoon data display unit 530 may further include font editor units 535 (shown in FIG. 5B) and 536 (shown in FIG. 5C). Image data and text data of a cartoon received from the content participation translation apparatus 100 are displayed on the cartoon data display unit 530. Also, when a second-language text is input via the text data editor unit 540, the input second-language text may be reflected and displayed on the text data display unit 532 of the cartoon data display unit 530.

In detail, image data of a cartoon is displayed on the image data display unit 531 of the cartoon data display unit 530. In general, a cartoon, and particularly, a webtoon which is a cartoon content consumed actively via the Internet, is created to be viewed in a vertical direction. Thus, since all of image data of the cartoon is not displayed within one screen, the cartoon is generally created and viewed while scrolling is performed on the screen in an up or down direction. Thus, a scroll unit 33 may be also formed near the cartoon data display unit 530, and the image data may be scrolled in an up or down direction when the scroll unit 533 is manipulated according to a user input.

Text data of a cartoon is displayed on the text data display unit 532 of the cartoon data display unit 530. In this case, a plurality of text data display units 532 may be displayed, and a plurality of unit texts may be displayed on the plurality of text data display units 532, respectively. For example, the plurality of text data display units 532 may correspond to a plurality of tooltips, respectively.

First, a first-language text included in an original of cartoon data or a translation of the cartoon data may be displayed on the text data display unit 532. For example, as illustrated in FIG. 5A, if a user first participates in translating the episode into a language, and therefore a translation of the cartoon data into the language does not exist, then a first-language text included in the original of the cartoon data may be displayed on the text data display unit 532. Otherwise, even when a translation of the cartoon data of the episode of the cartoon already exists, the first-language text included in the original of the cartoon data or the translation of the cartoon data may be set to be displayed on a text data display unit 532.

As illustrated in FIGS. 5B and 5C, when a translation of the cartoon data of the episode of the cartoon already exists, a second-language text included in the translation of the cartoon data may be displayed on the text data display unit 532. In this case, a plurality of second-language texts translated by different translators may be included in the translation of the cartoon data. In this case, a most recently stored second-language text may be displayed on the text data display unit 532, or a second-language text selected by a manager or mostly preferred by users may be displayed as a default on the text data display unit 532.

When a user inputs a second-language text via the second-language text input unit 543 of the text data editor unit 540 which will be described below, the input second-language text may be reflected and a preview thereof may be provided in the text data display unit 532 in real time or at a predetermined time interval. As described above, when a user inputs a second-language text, the input second-language text may be reflected and a preview thereof may be displayed on the cartoon data display unit 530 in real time or at a predetermined time interval. Thus, the user may check how a translation that he or she inputs is reflected and displayed in image data. Accordingly, a translation that is most appropriate for an image may be input.

As illustrated in FIG. 5B, the cartoon data display unit 530 may further include the font editor unit 535. FIG. 5B illustrates a case in which the font editor unit 535 is applied to the whole text in the text data display 532.

The font editor unit 535 edits a font of the whole text in the text data display unit 532 displayed on the image data display unit 531. For example, the font editor unit 535 may provide a function of selecting the type, size, color, features (e.g., a bold type, an italic type, etc.), an outline color, an outline thickness, etc. of the font of the whole text. In the case of a major language, a basic font type and size thereof may be designated. Furthermore, the font editor unit 535 may provide a function of editing a background color, transparency, size, angle of rotation, location, etc. of the text data display unit 532 provided as a tooltip.

FIG. 5C illustrates a case in which the font editor unit 536 is individually provided for each of unit texts.

The font editor unit 536 individually edits the font of each of unit texts included in the text data display unit 532 displayed on the image data display unit 531. For example, the font editor unit 536 may provide a function of selecting the type, size, color, features (e.g., a bold type, an italic type, etc.), an outline color, an outline thickness, etc. of the font of each of the texts. In the case of a major language, a basic font type and size thereof may be designated. Furthermore, the font editor unit 536 may provide a function of selecting a background color, transparency, size, angle of rotation, location, etc. of the text data display unit 532 provided as a tooltip.

That is, a translations editor providing apparatus (the content participation translation apparatus 100) according to an exemplary embodiment may adjust the font, size, and color of a text displayed according to an input given from a user (a translator), and information (the font, size, and color information) regarding the text adjusted by the user may be stored in a configuration file in the database 190. The font, size, and color of a text displayed based on the information (the font, size, and color) regarding the text stored in the configuration file input by the user may be adjusted and displayed. Also, a user may designate the font, size, and color of each of the texts of each of webtoons. The configuration file is configured to store and manage a user's text information (font, size, and color information) in units of webtoons.

In another exemplary embodiment, a translations editor providing apparatus may provide information (font, size, color information, etc.) regarding a text input by a first user with respect to a first webtoon to not only the first user but also a second user. For example, if the first user designates the font of a text as Gullimche, the size of the text as '12', and the color of the text as blue with respect to the first webtoon, the second user may designate the font of a text as Gullimche, the size of the text as '12', and the color of the text as blue when the second user inputs a translation for the first webtoon, similar to the first user.

Referring back to FIGS. 5A, 5B, and 5C, the text data editor unit 540 includes a plurality of unit text editor units 541. The plurality of unit text editor units 541 of FIG. 5A may edit a plurality of unit texts, respectively. Here, as described above, each of the plurality of unit texts may be one sentence, one paragraph, one dialogue, etc., and denotes one of texts classified and stored as unit texts when an author creates an original of cartoon data. For example, the cartoon original author may classify and store a text included in one tooltip as one unit text. Such a unit text classified and stored by a cartoon original author may be used as a basic unit of a translation during a subsequent participation translation.

Each of the plurality of unit text editor units 541 includes the first-language text display unit 542, the second-language text input unit 543, a 'store' button 544, and a 'cancel' button 545. Each of the plurality of unit text editor units 541 may further include a 'view other translations' button 546, and an 'other translations' display unit 547.

A first-language text included in an original of cartoon data or a translation of the cartoon data is displayed on the first-language text display unit 542.

The second-language text input unit 543 may be provided as a text input window in which a translation in a second language is input.

As illustrated in FIG. 5A, if a user first participates in translating the cartoon data into a language, and therefore a translation of the cartoon data into the language does not exist, then the second-language text input unit 543 may be provided in a state in which no text is displayed therein. Otherwise, even if a translation of the cartoon data of the episode of the cartoon already exists, a second-language text input unit 543 may be provided in a state in which no text is displayed therein.

Otherwise, as illustrated in FIGS. 5B and 5C, if a translation of the cartoon data of the episode of the cartoon already exists, a second-language text included in the translation of the cartoon may be displayed on the second-language text input unit 543. In this case, a plurality of second-language texts translated by different translators may exist in the translation of the cartoon data. In this case, a most recently stored second-language text may be displayed on the second-language text input unit 543 or a second-language text selected by a manager or mostly preferred by users may be displayed as a default on the second-language text input unit 543.

In this state (i.e., in a state in which no text is displayed or an existing second-language text is displayed), a user may edit (input, modify, delete, etc.) a translation in the second-language text input unit 543.

As described above, when a user inputs a second-language text via the second-language text input unit 543 of the text data editor unit 540, the input second-language text may be reflected and a preview thereof may be provided in the text data display unit 532 in real time or at a predetermined time interval. As described above, when a user inputs a second-language text, the input second-language text may be reflected and displayed in the cartoon data display unit 530 in real time. Thus, since the user may check how a translation that he or she inputs is reflected and displayed in image data in real time, a translation that is most appropriate for an image may be input.

The 'store' button 544 may be configured to store a second-language text input into the second-language text input unit 543. When a user selects the 'store' button 544, the second-language text input into the second-language text input unit 543 is transmitted to the content participation translation apparatus 100, and the content storage unit 150 of the content participation translation apparatus 100 merges the second-language text with image data and a first-language text of an original of cartoon data stored beforehand and stores a result of merging them as a translation of the cartoon data. In this case, the content storage unit 150 may update a previously stored second-language text to a newly received second-language text or may store the newly received second-language text while maintaining the previously stored second-language text. That is, a plurality of second-language texts may be stored with respect to one unit text. In this case, second-language texts input by a plurality of users may be classified according to unit texts and stored in different layers.

Although FIG. 5A illustrates that a plurality of 'store' buttons 544 are provided for the plurality of unit text editor units 541, respectively, exemplary embodiments are not limited thereto and a 'store all' button (not shown) may be additionally provided so that second-language texts input to all of the plurality of unit text editor units 541 may be stored at once.

The 'cancel' button 545 may be configured to delete, i.e., reset, a second-language text input to the second-language text input unit 543.

The 'view other translations' button 546 may display a plurality of second-language texts translated by different translators. Next to the 'view other translations' button 546, the number of second-language texts translated by different translators may be displayed.

When a user selects the 'view other translations' button 546, the 'other translations' display unit 547 may be provided near the second-language text input unit 543 to display translations input by other users thereon. The name of a translator and a translation may be displayed on the 'other translations' display unit 547. A right to modify or delete each of translations may be assigned to a manager.

Figure 6A:
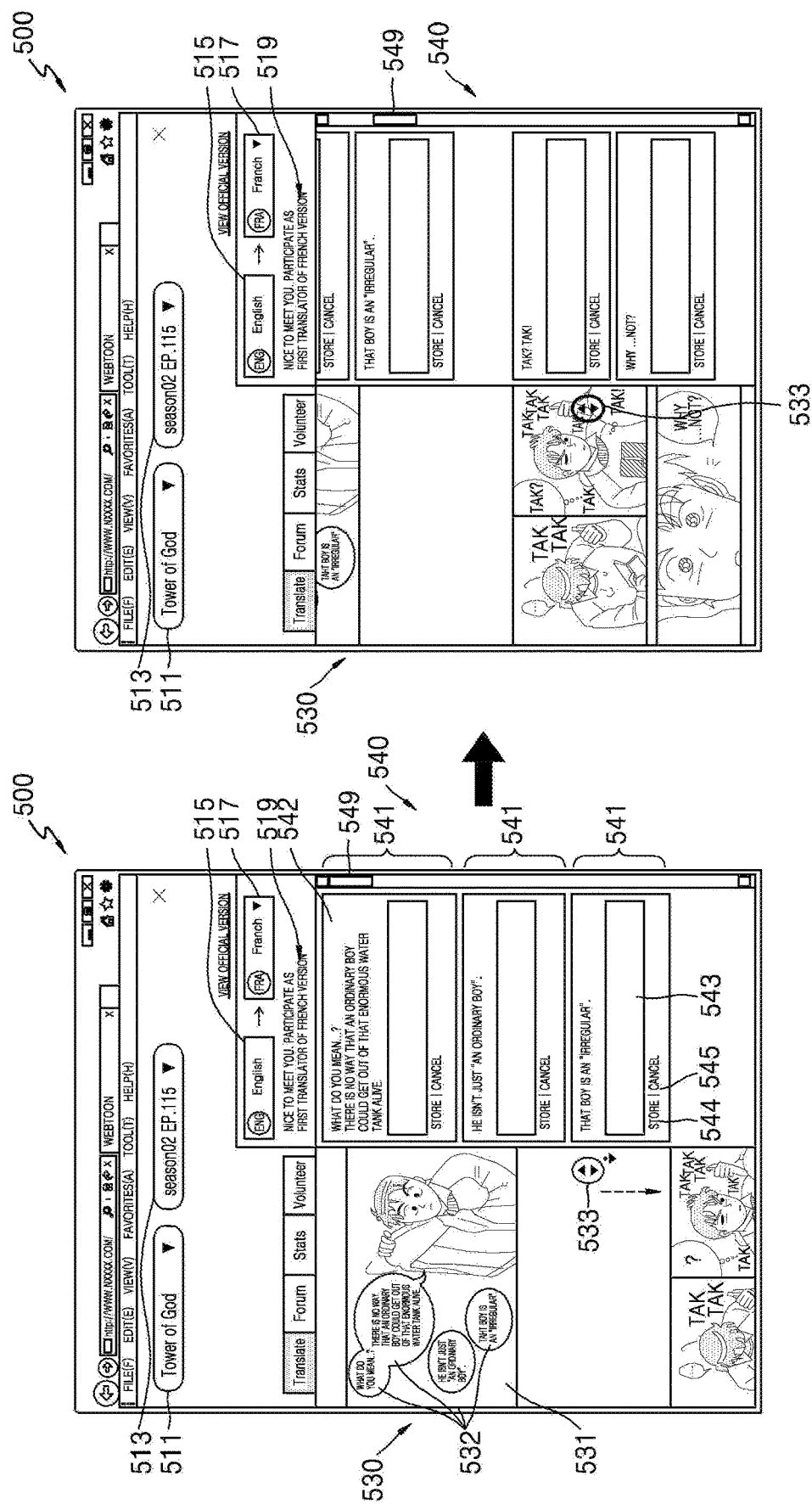
FIGS. 6A and 6B illustrate states in which a translations editor is scrolled on a user terminal.
Figure 6B:
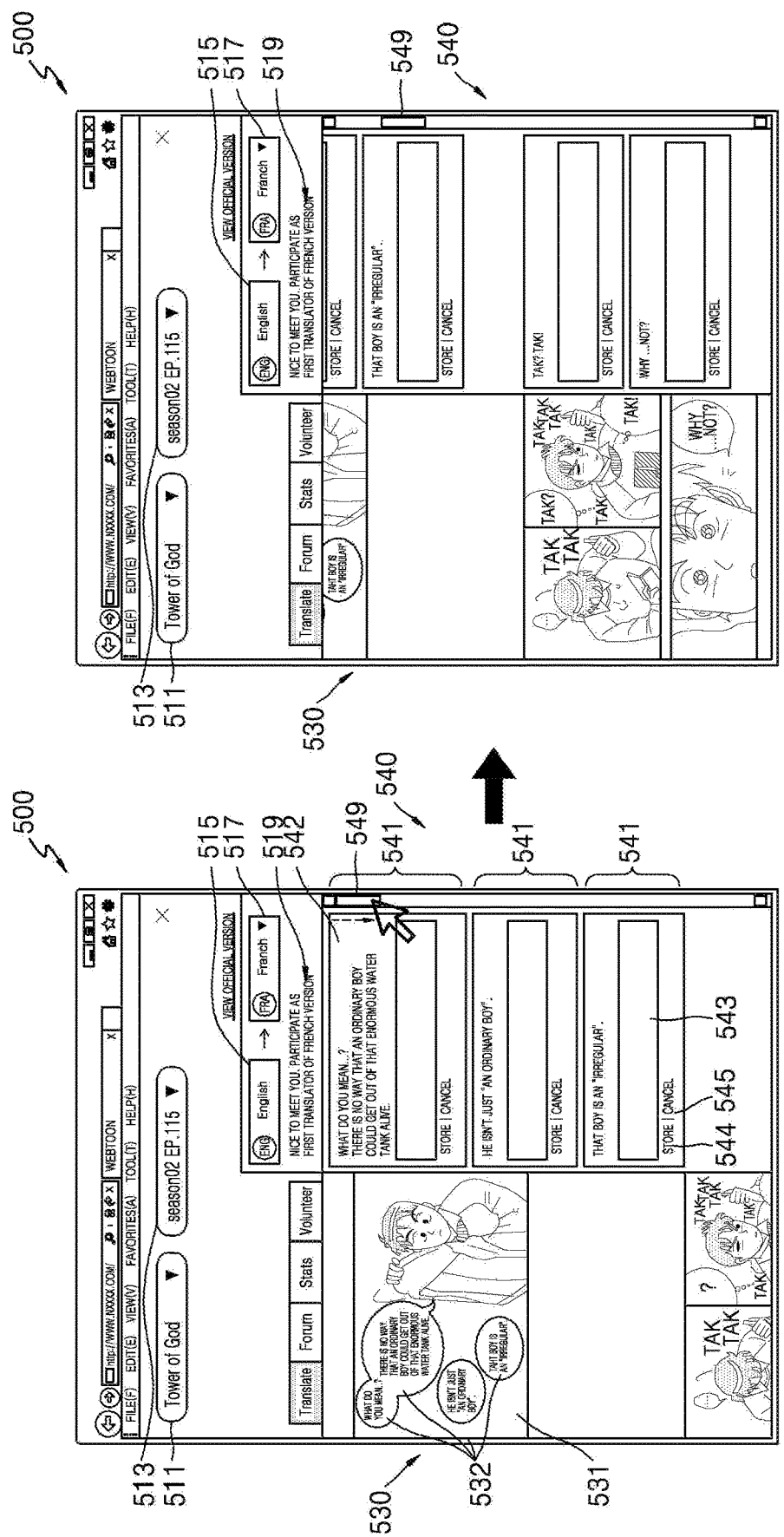

FIGS. 6A and 6B illustrate states in which a translations editor 500 is scrolled on a user terminal 200.

FIG. 6A illustrates a state in which when a user scrolls an image displayed on a screen in a direction of an arrow by manipulating the scroll unit 533 of the cartoon data display unit 530, the text data editor unit 540 is moved with the image, and thus text data corresponding to currently displayed image data is displayed on the text data editor unit 540. That is, when the user scrolls the image in the cartoon data display unit 530 in the direction of the arrow as illustrated in the left diagram of FIG. 6A, the image data is moved and the text data editor unit 540 is also moved with the image data and thus a unit text editor unit 541 synchronized with the currently displayed image is continuously displayed on the screen, as illustrated in the right diagram of FIG. 6A. In this case, a scroll unit 549 of the text data editor unit 540 is moved down by a degree corresponding to the degree to which the text data editor unit 540 is moved.

FIG. 6B illustrates a state in which when a user scrolls the text data editor unit 540 in a direction of an arrow by manipulating the scroll unit 549 of the text data editor unit 540, image data displayed on the cartoon data display unit 530 is moved with the text data editor unit 540 and thus a region of the image data corresponding to a currently displayed unit text is displayed on the cartoon data display unit 530. That is, when the user scrolls the text data editor unit 540 in the direction of the arrow as illustrated in the left diagram of FIG. 6B, the text data editor unit 540 is moved and the image data on the cartoon data display unit 530 is also moved with the text data editor unit 540, and thus an image synchronized with a unit text editor unit 541 currently displayed on the screen is continuously displayed on the screen as illustrated in the right diagram of FIG. 6B.

Although FIGS. 6A and 6B illustrate cases in which a user selects and scrolls the scroll unit 533 of the cartoon data display unit 530 or the scroll unit 549 of the text data editor unit 540, exemplary embodiments are not limited thereto and should be understood to include cases in which a user scrolls in various other ways, e.g., by rotating the wheel of a mouse or using a touch-and-drag operation.

Figure 7:
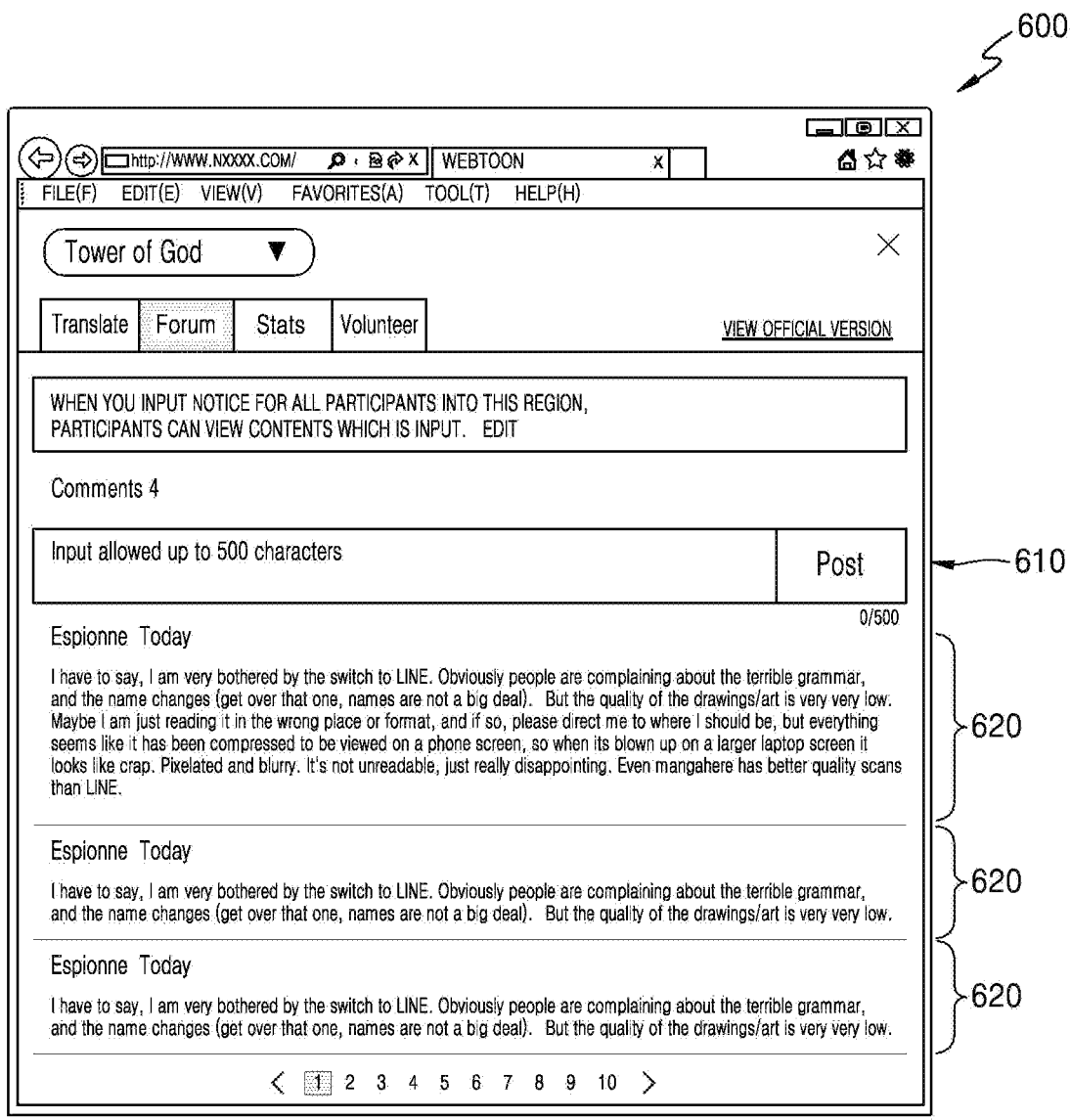
FIG. 7 illustrates a screen including a translation bulletin board and displayed on a user terminal.

FIG. 7 illustrates a screen including a translation bulletin board and displayed on a user terminal.

Referring to FIG. 7, a translation bulletin board 600 is displayed on the user terminal 200 of FIG. 3, and a translation opinion input unit 610 and a translation opinion display unit 620 are displayed on the translation bulletin board 600.

In detail, users may present their opinions regarding a translation, and the opinions may be displayed on the translation bulletin board 600. The translation opinion input unit 610 may be provided as a text input window in which users may input their opinions regarding a translation. The users' opinions may be listed on the translation opinion display unit 620.

As described above, a bulletin board, in which users may freely present their opinions regarding a translation, may be provided to greatly improve the quality of participation translation and cause users' participation in a translation process.

Figure 8:
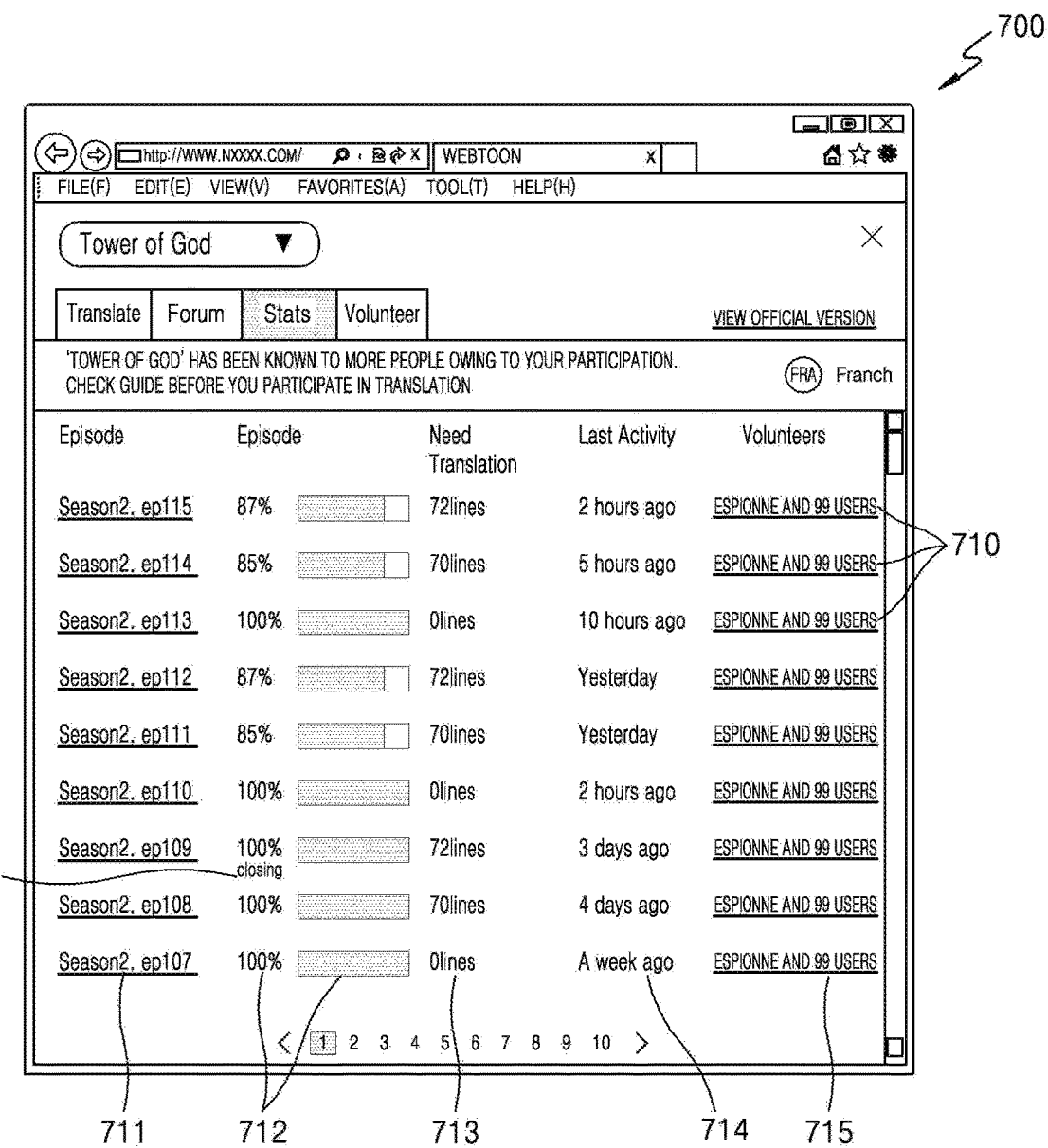
FIG. 8 illustrates a screen including a list of translations and displayed on a user terminal.

FIG. 8 illustrates a screen including a list of translations and displayed on a user terminal.

Referring to FIG. 8, a list of translations 700 of the episodes of a cartoon is displayed on the user terminal 200. In this case, a plurality of translation information display units 710 may be displayed on the list of translations 700. Each of the plurality of translation information display units 710 may include an episode information display unit 711, a translation progress display unit 712, a number-of-sentences-to-be-translated display unit 713, a recent translation time display unit 714, and a participating-translator display unit 715.

The plurality of translation information display units 710 may be arranged and displayed in a descending order, starting from the one updated the latest, or may be arranged and displayed in other various ways, e.g., according to the progress of a translation process, popularity, etc.

Episode information representing the number of the episode of the cartoon corresponding to each of the translations may be displayed on the episode information display unit 711.

The progress of translating each of the episodes of the cartoon may be displayed on the translation progress display unit 712. The progress of translation of each of the episodes of the cartoon may be calculated by a formula of {(the number of translated sentences of the episode)/(the number of total sentences of the episode)}. In this case, the progress of the translation process may be displayed on the translation progress display unit 712 in the form of a percentage or the form of a progress bar. A translation completion indicator 712a may be further displayed on the translation progress display unit 712. That is, the translation completion indicator 712a may be marked with respect to a case for which a participation in the translation of the cartoon episode has ended due to the completion of the translation and a review thereof, and thus, users cannot participate in the translation of the episode.

The number of sentences of an episode (which has yet to be translated) to be additionally translated may be displayed on the number-of-sentences-to-be-translated display unit 713. Here, the number of the sentences to be additionally translated may be the number of unit texts to be translated as described above.

A time when an episode is most recently translated may be displayed on the recent translation time display unit 714. Although FIG. 8 illustrates the number of hours that have passed from a current point of time so as to represent a time when each of the episodes was most recently translated, exemplary embodiments are not limited thereto and a time when a translation is most recently done may be directly displayed.

A translator who participates in translating an episode may be displayed on the participating-translator display unit 715. When a plurality of translators participate in the translation of the episode, the name of a representative translator (e.g., a translator who translated a largest number of sentences of the episode) may be displayed.

Figure 9:
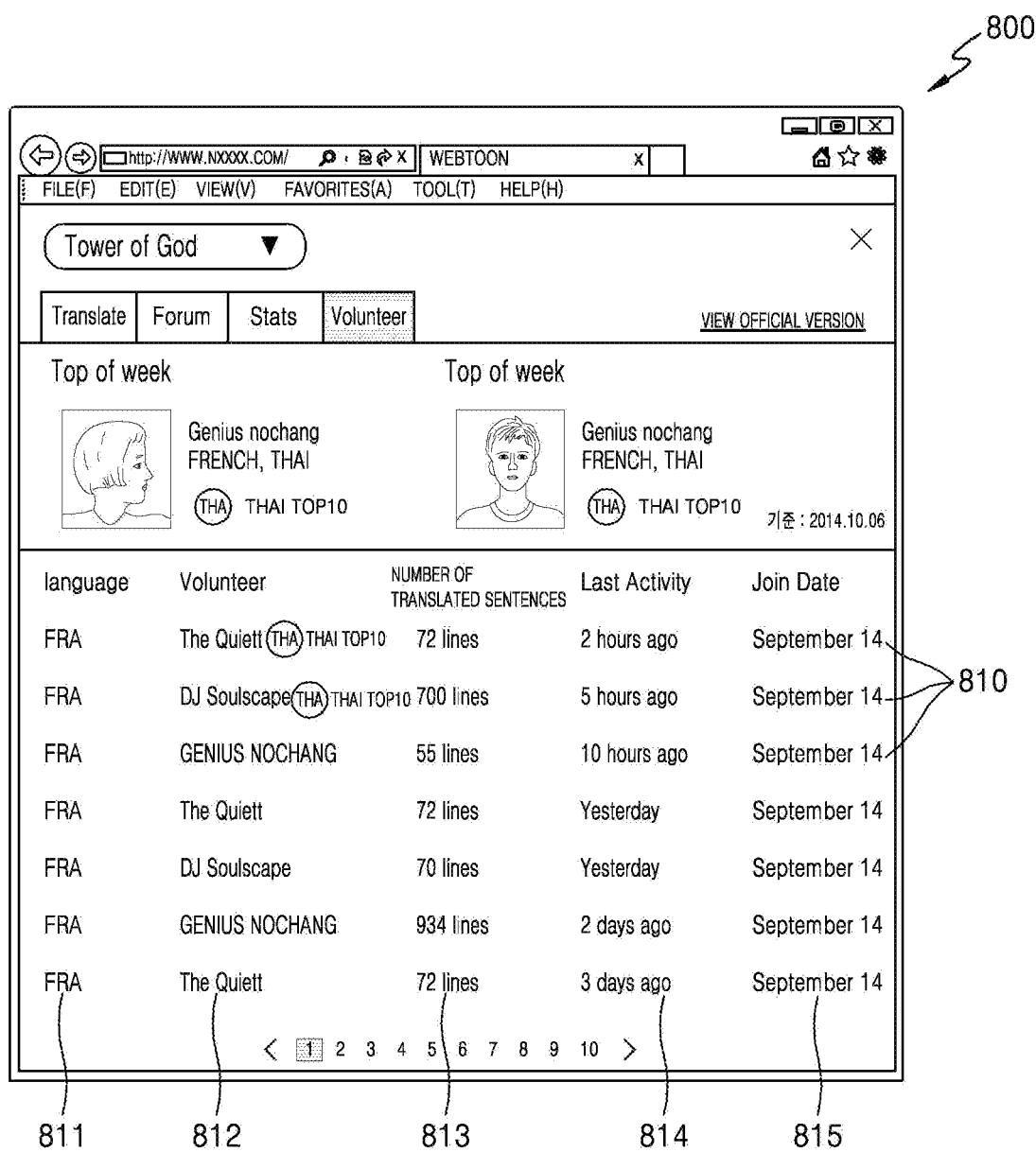
FIG. 9 illustrates a screen including a list of translators and displayed on a user terminal.

FIG. 9 illustrates a screen including a list of translators and displayed on a user terminal.

Referring to FIG. 9, a list of translators 800 who participate in translating a cartoon is displayed on the user terminal 200. In this case, a plurality of translator information display units 810 may be displayed on the list of translators 800. Each of the plurality of translator information display units 810 may include a translation language display unit 811, a translator title display unit 812, a number-of-translated sentences display unit 813, a recent translation time display unit 814, and a sign-up date display unit 815.

The plurality of translator information display units 810 may be arranged and displayed in the order of the number of translated sentences or may be arranged and displayed in various other ways, e.g., in a descending order, starting from the most recent translation, according to popularity, etc.

A language that a translator uses to participate in a translation process may be displayed on the translation language display unit 811. For example, when a translation is done using French, characters 'FRA' may be displayed on the translation language display unit 811. Otherwise, a language that a translator uses to participate in a translation process may be displayed in various other ways, e.g., using a color, a sign, etc.

The name of a translator (an individual or a translation team) of a cartoon may be displayed on the translator display unit 812.

The number of sentences translated by a translator may be displayed on the number-of-translated sentences display unit 813. In this case, the number of sentences may be the number of translated sentences of all of cartoons, the number of translated sentences of a specific cartoon, or the number of translated sentences of a specific episode of a specific cartoon.

A time when a translator has recently performed a translation may be displayed on the recent translation time display unit 814. Although FIG. 9 illustrates the number of hours that have passed from a current point of time so as to represent a time when each of the episodes was most recently translated, exemplary embodiments are not limited thereto and a time when a translation is most recently done may be directly displayed.

A date when a translator has joined a participation translation site may be displayed on the sign-up date display unit 815.

Figure 10:
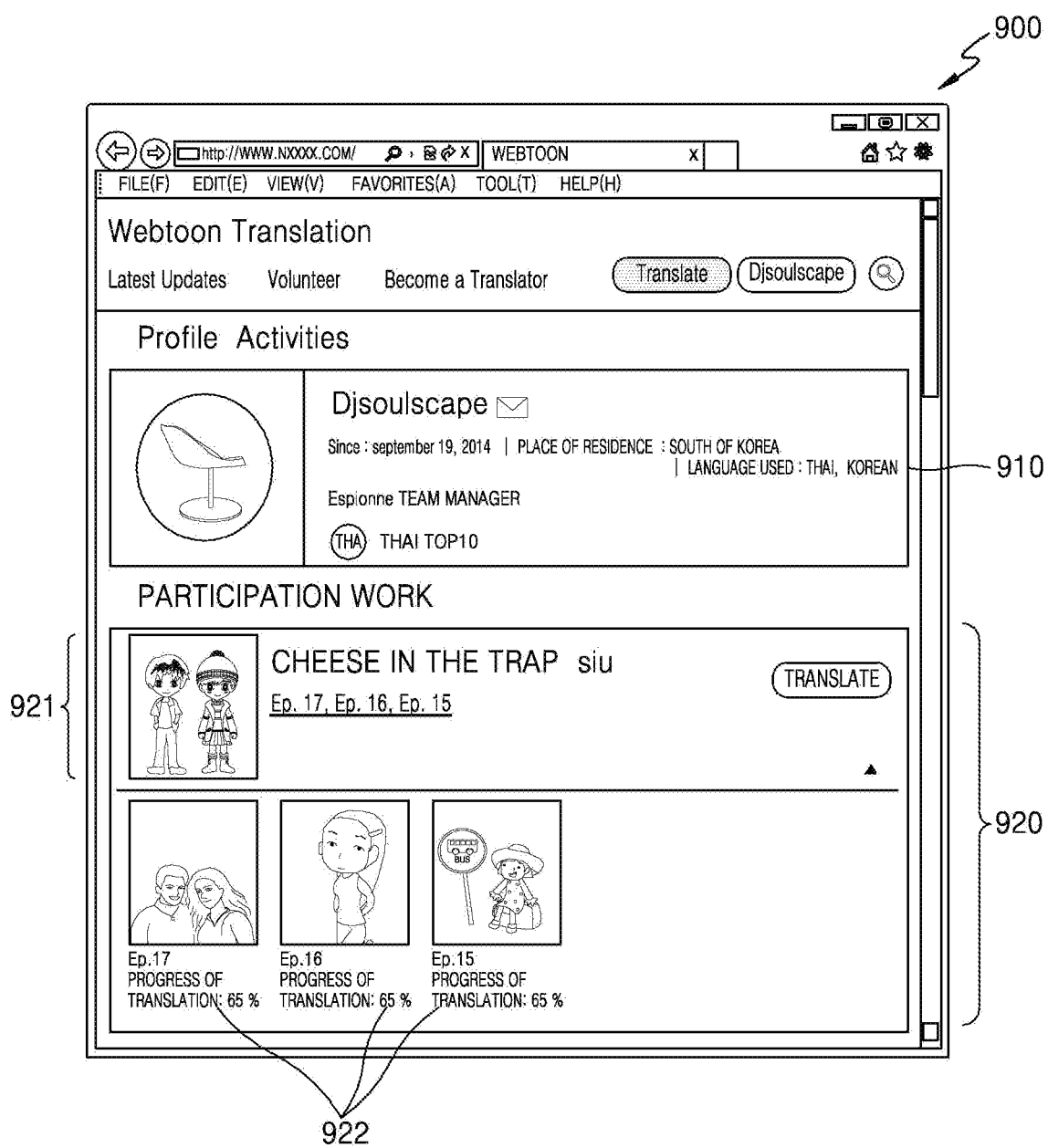
FIG. 10 illustrates a screen including a translator's profile and displayed on a user terminal.

When any of the plurality of translator information display units 810 is selected, a profile page of the selected translator is displayed on the screen of the user terminal 200, as illustrated in FIG. 10.

Referring to FIG. 10, a translator's profile 900 is displayed on the user terminal 200. In this case, a translator information display unit 910 and a translation participation work display unit 920 are displayed on the translator's profile 900.

In the translator information display unit 910, the translator's representative image, the translator's sign-up date, a language selected by the translator, information regarding a team to which the translator belongs, information regarding the translator's ranking, etc., are provided.

The translation participation work display unit 920 may include a participation work information display unit 921 and an episode information display unit 922. When the translator participates in translating a plurality of types of work (i.e., the subject of translation), a plurality of translation participation work display units 920 may be displayed. In detail, a representative image, the title, the number of an episode, etc. of a cartoon for which the translator is participating in a translation process may be displayed on the participation work information display unit 921. A representative image, episode information, the progress of a translation process, etc. of an episode for which the translator is participating in a translation process may be displayed on the episode information display unit 922.

Figure 11:
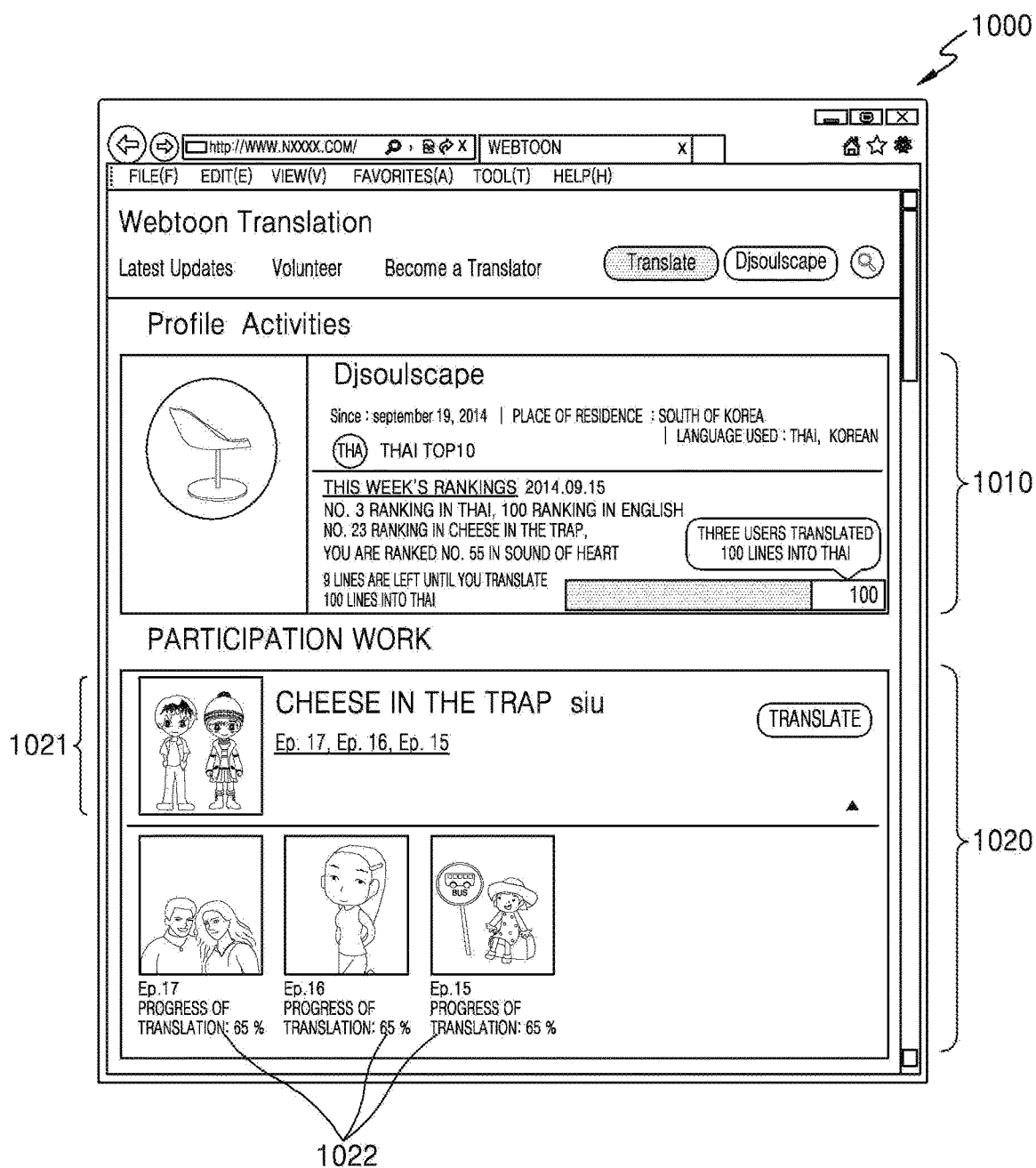
FIG. 11 illustrates a screen including a translator's own profile and displayed on a user terminal.

FIG. 11 is a screen including a translator's own profile and displayed on a user terminal.

Referring to FIG. 11, the translator's own profile 1000 of a translator who logs in is displayed on the user terminal 200. In this case, a translator information display unit 1010 and a translation participation work display unit 1020 may be displayed on the translator's own profile 1000.

In the translator information display unit 1010, the translator's representative image, a sign-up date, a language that the translator is using, information regarding a team to which the translator belong, information regarding the translator's ranking, etc. may be displayed.

Furthermore, the translator's rankings in the translation processes in which he or she is participating, which are classified according to languages or types of work, and the number of sentences left until a target value of a translation (e.g., 100, 300, 500, or 1000 sentences) is achieved may be additionally displayed on the translator information display unit 1010 of the translator who logs in. Also, the number of translators who have achieved the target value of a translation into a language may be displayed.

The translation participation work display unit 1020 may include a participation work information display unit 1021 and an episode information display unit 1022. Here, when the translator has participated in translating a plurality of different types of work, a plurality of translation participation work display units 1020 may be displayed.

The translator's representative image illustrated in FIG. 10 or 11 may be a photo or an image registered by the translator. If no photo or image is registered, an image of a character included in a work translated by the translator may be used as the translator's representative image according to the translator's request. In another exemplary embodiment, when a plurality of different types of work are translated by the translator, the translator's representative image may be an image of at least one character included in the work or an image selected among images of the at least one character according to various criteria. Here, the selecting of the image among images of the at least one character according to the various criteria may be understood as selecting an image by the translator or selecting an image which is highly related to a portion of a translation created by the translator.

In detail, the translator's representative image may be an image included in a portion of a work for which the translator participates in a translation process or may be an image of a main character of a work translated by the translator. Otherwise, the translator's representative image may be an image of a character that is considered to be appeared most frequently when at least one portion of a work translated by the translator, for which the translator participates in translating, is comprehensively analyzed.

In general, when no profile photo is registered, a space for the translator's representative image is left as a blank or a meaningless default image, e.g., a default drawing denoting a human face, is provided. In contrast, with a method according to an exemplary embodiment, fun elements may be added to a screen provided to a user, the configuration of a screen provided to a user may be enriched, and information regarding a work for which a translator participates in translating may be also provided using the translator's representative image.

Figure 12:
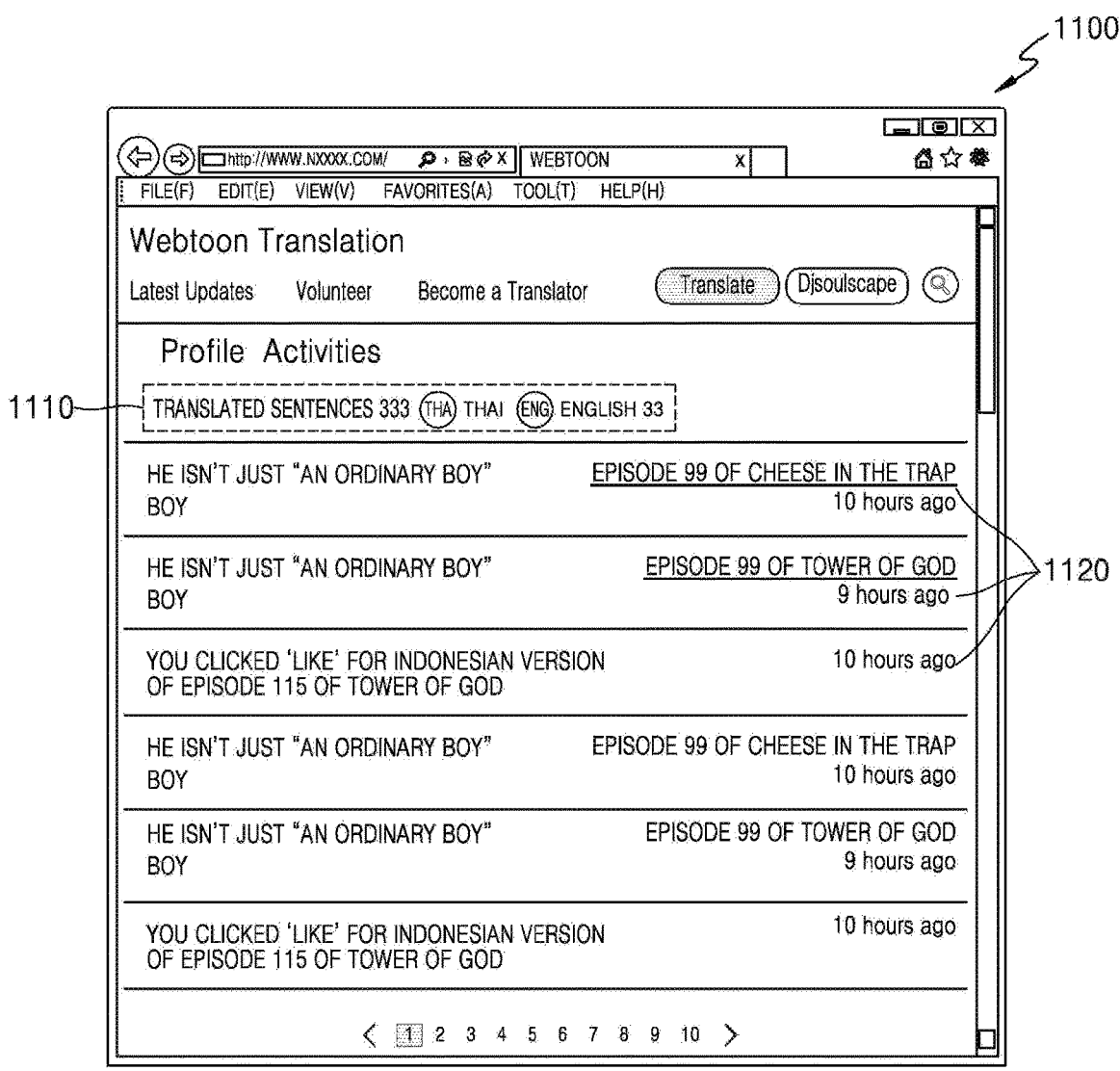
FIG. 12 illustrates a screen including a translator' activities and displayed on a user terminal.

FIG. 12 is a screen including a translator's activities and displayed on a user terminal.

Referring to FIG. 12, the translator's activities 1100 are displayed on the user terminal 200. In this case, a translation amount display unit 1110 and a translated sentences display unit 1120 may be displayed to represent the translator's activities.

In the translation amount display unit 1110, the total number of sentences translated by the translator and the number of sentences translated in each of languages may be displayed.

In the translated sentences display unit 1120, each of the sentences translated by the translator may be displayed. When a plurality of sentences are translated by the translator, a plurality of translated sentences display units 1120 may be displayed. The plurality of translated sentences display units 1120 may be arranged and displayed in a descending order, starting from the latest one.

In each of the plurality of translated sentences display units 1120, an original text (a first-language text) or a translated text translated by the translator (a second-language text) may be displayed. Also, information regarding a cartoon and an episode including the text may be displayed. Also, the time when the text was translated may be displayed.

In each of the plurality of translated sentences display units 1120, the work, a translation, etc. for which the translator inputs 'like' button may be displayed.

Figure 13:
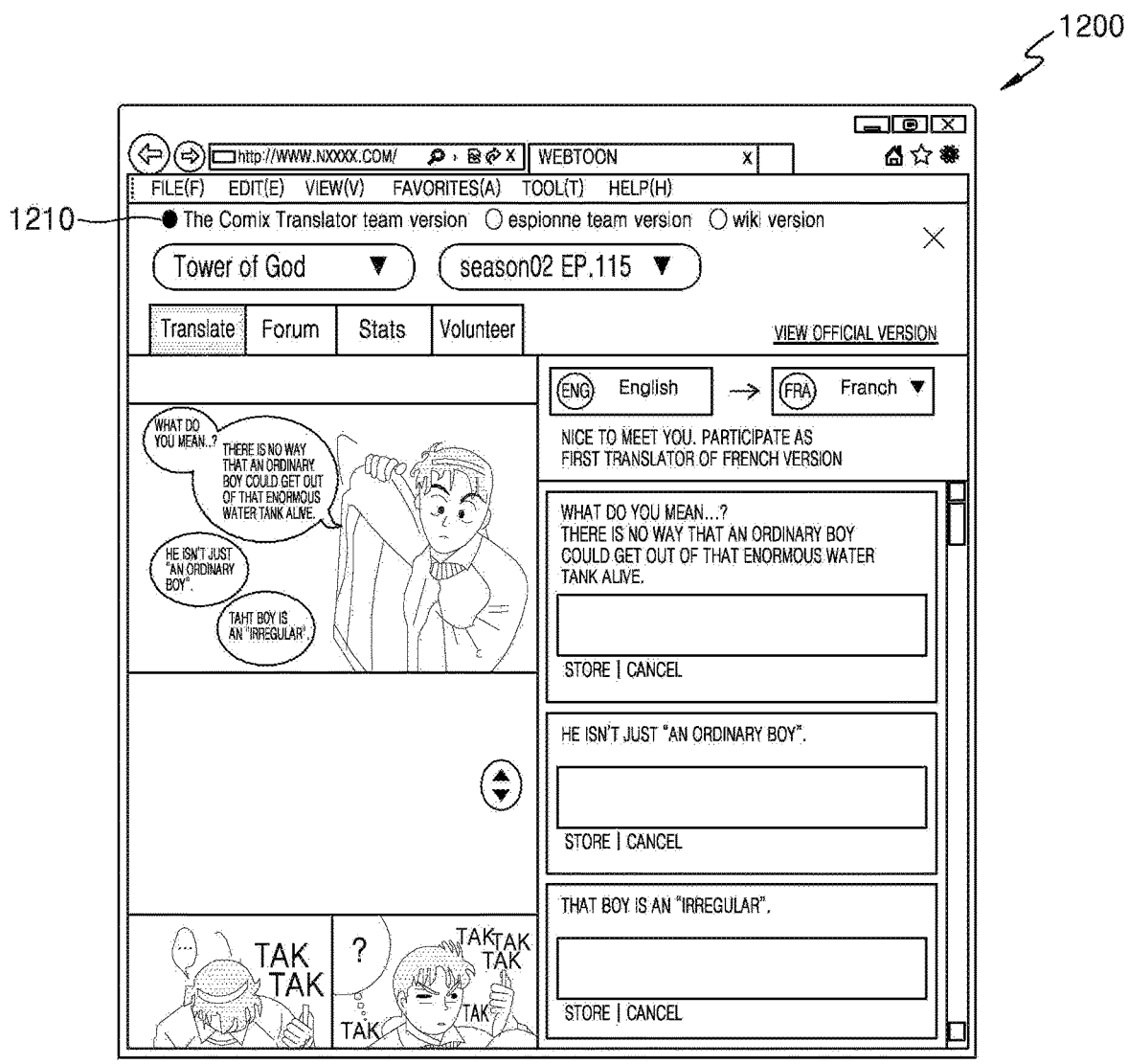
FIG. 13 illustrates a screen including a translations editor of a team version and displayed on a user terminal.

FIG. 13 illustrates a screen including a translations editor of a team version and displayed on a user terminal.

As described above, the content participation translation system 1 according to an exemplary embodiment may simultaneously or selectively provide a Wiki translation and team translation. The term "Wiki translation" means a translation process in which any user may freely participate as described above with reference to FIGS. 1 to 12. That is, Wiki translation may be understood as a translation process in which a plurality of users may participate in a translation of one cartoon, in which they may input, modify, or delete a translation. In this case, all translations input by the plurality of users may be stored or a translation of the cartoon may be updated to a most recently input translation.

The term "team translation" means a translation process in which a right to participate is assigned to only members of a predetermined team. That is, the team translation is the same as the Wiki translation in that a plurality of users may participate therein but is different from the Wiki translation in that the right to participate in a translation process is assigned to only the members of the predetermined team rather than all users. Similarly, in the team translation, a plurality of team members may participate in a translation of one cartoon, in which they may input, modify, or delete a translation. The team translation may be performed in various ways, e.g., all translations input by the plurality of team members may be stored or a translation of the cartoon may be updated to a most recently input translation.

In this case, in even one team, different rights may be assigned to a team manager, team members, etc. The team manager may select the best translation among translations input by a plurality of team members, and manage joining, withdrawal, etc. of team members.

The translations editor 1200 of a team version illustrated in FIG. 13 is different from the translations editor 500a of a Wiki version illustrated in FIG. 5, in that a version selection unit 1210 is additionally provided to select between a team-version translation or a Wiki-version translation. In particular, when a user belongs to a plurality of teams, the translations editor 1200 may display all of the teams to which the user belongs and allow the user to select a team with which the user will participate in a translation of a cartoon.

Figure 14:
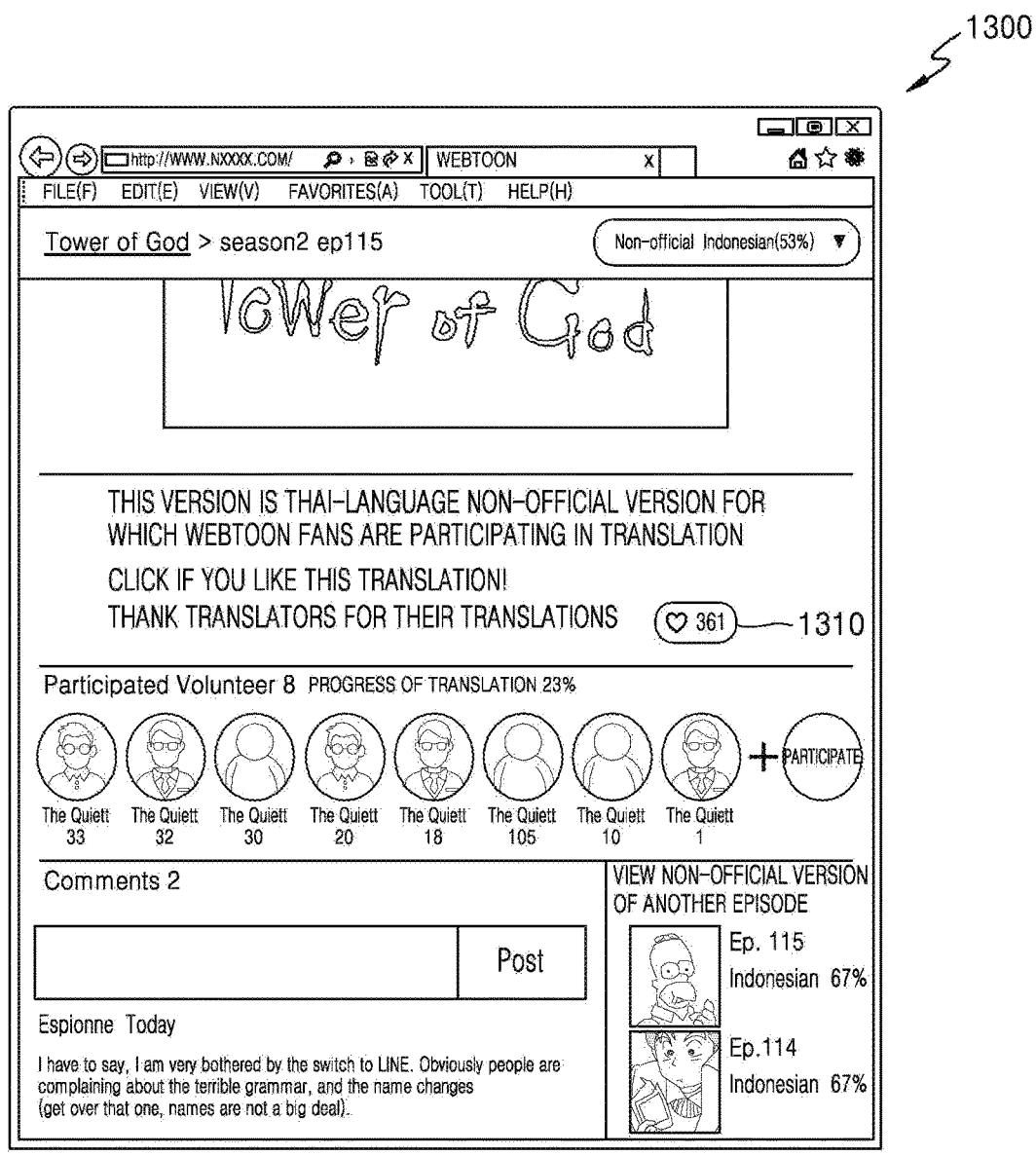
FIG. 14 is a screen including a result of evaluating a translation and displayed on a user terminal.

FIG. 14 is a screen including a result of evaluating a translation 1300 and displayed on the user terminal 200.

As described above, a content participation translation system 1 according to an exemplary embodiment may be configured to not only enable a user to participate in a translation process but also quantitatively evaluate a user who participates in the translation process. That is, each of the translators may be evaluated based on quantitative values of the activities of the translator, e.g., the number of translated sentences, the number of times that the translator visited a participation translation site, the number of times that the translator has viewed other users' translations, the number of followers, etc. As an evaluation result, a predetermined translation ranking may be assigned to each of the translators. Furthermore, a predetermined credit may be given to a translator who receives a favorable evaluation result.

The content participation translation system 1 according to an exemplary embodiment may also be configured to not only enable a user to participate in a translation process but also enable other uses to evaluate a translation of the user who participates in a translation process. That is, users who view a translation may evaluate a translator or a translation team that inputs the translation by inputting the 'like' button 1310.

The content participation translation system 1 according to another exemplary embodiment may be configured to not only evaluate a translator or a member belonging to a translation team but also evaluate a translation of a cartoon or a translation of an episode of the cartoon.

As described above, a user who participates in a translation process may be evaluated in various ways and a predetermined credit may be given to a translator who receives a favorable evaluation result, thereby inducing users to more actively and voluntarily participate in translation processes. With use of this translation system, the quality of translation may be improved and professional translators may be trained.

A cartoon participation translation method according to an exemplary embodiment will be described in detail below.

Figure 15:
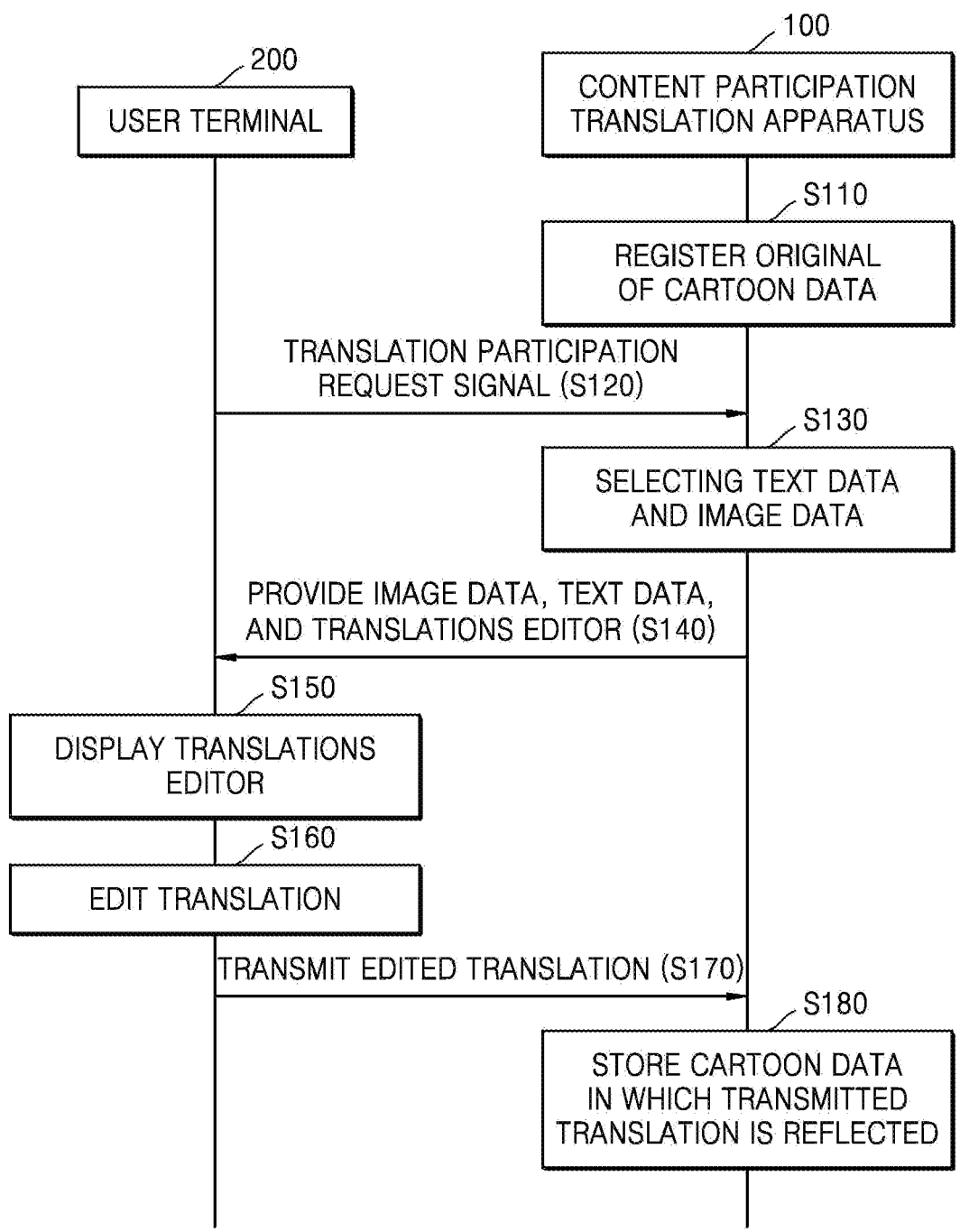
FIG. 15 is a flowchart of a cartoon participation translation method according to an exemplary embodiment.

FIG. 15 is a flowchart of a cartoon participation translation method according to an exemplary embodiment. Referring to FIG. 15, the cartoon participation translation method according to an exemplary embodiment includes registering an original of cartoon data with a content participation translation apparatus 100 (operation S110), transmitting a translation participation request signal to the content participation translation apparatus 100 from a user terminal 200 (operation S120), individually selecting text data and image data included in the cartoon data for which the translation participation request signal is received, performed by the data selection unit 130 of the content participation translation apparatus 100 (operation S130), providing the image data, the text data, and a translations editor to the user terminal 200 from the content participation translation apparatus 100 (operation S140), displaying the translations editor on the user terminal 200 (operation S150), editing a translation of the cartoon data on the user terminal 200 according to a signal input by a user (operation S160), transmitting the edited translation from the user terminal 200 to the content participation translation apparatus 100 (operation S170), and storing a translation of the cartoon data, in which the transmitted translation is reflected, performed by the content storage unit 150 of the content participation translation apparatus 100 (operation S180).

The above operations of the cartoon participation translation method will be described in detail below.

First, an original of cartoon data is registered with the content participation translation apparatus 100 (operation S110). In detail, the content registration unit 120 registers the original of the cartoon data, which is a translation target, on the database 190 of the content participation translation apparatus 100. In this case, the content registration unit 120 may directly receive the original of the cartoon data via an I/O unit (not shown) of the content participation translation apparatus 100 and register it with the database 190, or may receive the original of the cartoon data from the outside (e.g., a cartoonist) via the communication network 400 and register it with the database 190. In this case, text data and image data may be stored separately in the registered original of the cartoon data. In general, the text data included in the original of the cartoon data includes only a first-language text.

Next, a translation participation request signal is transmitted from the user terminal 200 to the content participation translation apparatus 100 (operation S120). That is, a user who wants to participate in a translation process may transmit the translation participation request signal to the content participation translation apparatus 100 by inputting a 'participate in translation' button in a cartoon list page (See FIG. 4) or the like.

Next, the data selection unit 130 of the content participation translation apparatus 100 individually selects text data and image data included in the cartoon data for which the translation participation request signal is received (operation S130). In detail, in the cartoon participation translation method according to an exemplary embodiment, cartoon data in which text data and image data are stored separately may be used, and thus, the text data and the image data may be easily and exactly separated from each other without using an additional image editing program or character recognition program. That is, an original of cartoon data in which text data and image data are stored in different layers may be received from a cartoonist and used in the participation translation system 1. Accordingly, a cartoon participation translation, in which text and images are required to be provided and edited separately, may be greatly easily and exactly realized.

The text data may include at least one unit text (e.g., one sentence, one paragraph, one dialogue, etc.), and each of the at least one unit text may be stored in a different layer.

In general, a first-language text is included in the original cartoon data, but not only the first-language text but also at least one second-language text may be included in a translation of the cartoon data that is being translated or is completely translated. Thus, the data selection unit 130 may select text data, which includes both the first-language text and the at least one second-language text, separately from image data, and may separately select the first-language text and the at least one second-language text.

Next, when the image data, the text data, and a translations editor (see, e.g., the translations editor 500*a* of FIG. 5A and the translations editor 1200 of FIG. 13) are provided from the content participation translation apparatus 100 to the user terminal 200 (operation S140), the translations editor is displayed on the user terminal 200 (operation S150). In detail, the content participation translation apparatus 100 transmits the image data and the text data selected by the data selection unit 130 to the user terminal 200. Also, the translations editor providing unit 140 of the content participation translation apparatus 100 transmits the translations editor to the user terminal 200.

In detail, the translations editor providing unit 140 provides the translations editor to at least one user terminal 200. Here, in the translations editor, the cartoon data display unit 530 of FIG. 5A displaying the text data and the image data and the text data editor unit 540 in which a translation is input in units of unit texts are displayed separately. That is, in the translations editor, the first-language text included in the original of the cartoon data may be displayed on the first-language text display unit 542 of FIG. 5A and at the same time, the second-language text input unit 543 of FIG. 5A in which a translation of the first-language text in a second language may be input may be provided at close proximity to the first-language text. Also, in the translations editor, when the image data is scrolled on the cartoon data display unit 530, the first-language text display unit 542 and the second-language text input unit 543 may be moved together with the cartoon data display unit 530.

Next, a translation is edited on the user terminal 200 according to a signal input from a user (operation S160). Referring back to FIG. 5A, the text data editor unit 540 includes the plurality of unit text editor units 541. Each of the plurality of unit text editor units 541 may be configured to edit a plurality of unit texts, respectively. Each of the plurality of unit text editor units 541 may include the first-language text display unit 542, the second-language text input unit 543, the 'store' button 544, and the 'cancel' button 545. Each of the plurality of unit text editor units 541 may further include the 'view other translations' button 546 and the 'other translations' display unit 547 (see FIGS. 5B and 5C).

A user may edit (input, modify, delete, etc.) a translation in the second-language text input unit 543 in a state in which the first-language text included in the original of the cartoon data or a translation of the cartoon data is displayed on the first-language text display unit 542.

In this case, when the user inputs a second-language text via the second-language text input unit 543 of the text data editor unit 540, the input second-language text may be reflected and displayed in the text data display unit 532 in real time or at a predetermined time interval. As described above, when a user inputs a second-language text, the input second-language text may be reflected and displayed in the cartoon data display unit 530 in real time, so that the user may check how a translation that he or she inputs is reflected and displayed in image data in real time. Accordingly, a translation that is most appropriate for an image may be input.

Next, the edited translation is transmitted from the user terminal 200 to the content participation translation apparatus 100 (operation S170). That is, when a user presses the 'store' button 544, the second-language text input to the second-language text input unit 543 is transmitted to the content participation translation apparatus 100.

Lastly, the content storage unit 150 of the content participation translation apparatus 100 stores the cartoon data in which the transmitted translation is reflected in the database 190 (operation S180). In detail, the content storage unit 150 receives the image data, the first-language text, and the second-language text from the user terminal 200, merges them, and stores, as a translation of the cartoon data, a result of merging the image data, the first-language text, and the second-language text. Otherwise, the content storage unit 150 may receive only the second-language text from the user terminal 200, merges it with the image data and the first-language text of the original of the cartoon data stored beforehand, and stores a result of merging them as a translation of the cartoon data.

As described above, according to an exemplary embodiment, a plurality of users may edit a translation of each of texts of a cartoon, which is provided in one language, into other languages, thereby translating the cartoon in many languages through users' participation in a translation process.

Also, a high-quality translation may be provided by inducing a plurality of users to participate in a translation process.

Also, when a user inputs a second-language text into a translations editor, the input second-language text may be reflected and displayed in a cartoon data display unit in real time, so that the user may check how a translation that he or she inputs is reflected and displayed in image data in real time. Accordingly, a translation that is most appropriate for an image may be input.

Also, users who participate in a translation process may be evaluated in various ways and a predetermined credit may be given to a translator who receives a favorable evaluation result, thereby inducing users to more actively and voluntarily participate in a translation process. Through the above translation system, the quality of a translation may be improved and professional translators may be trained.

The one or more of the above exemplary embodiments may be embodied as a computer program that can be executed in a computer using various components. The computer program may be recorded on a computer-readable recording medium. Examples of the computer-readable recording medium may include a magnetic recording medium (a hard disc, a floppy disc, a magnetic tape, etc.), an optical recording medium (a CD-ROM, a DVD, etc.), a magneto-optical medium (e.g., a floptical disk), and a hardware device (e.g., a ROM, a RAM, a flash memory, etc.) specially designed to store and execute program commands. Furthermore, the computer-readable recording medium may be a formless medium that can be transmitted and distributed in a network, e.g., software or an application.

The computer program may be designed and configured specially for the inventive concept or would be obvious to those of ordinary skill in the field of computer software. Examples of the computer program include not only machine language codes prepared by a compiler but also high-level language codes executable by a computer using an interpreter.

The particular implementations shown and described herein are exemplary embodiments and are not intended to otherwise limit the scope of the inventive concept in any way. For the sake of brevity, conventional electronics, control systems, software development and other functional aspects of the systems may not be described in detail. Furthermore, the lines or connecting elements shown in the appended drawings are intended to represent exemplary functional relationships and/or physical or logical couplings between the various elements. It should be noted that many alternative or additional functional relationships, physical connections or logical connections may be present in a practical device. Moreover, no item or component is essential to the practice of the inventive concept unless it is specifically described as "essential" or "critical".

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A content participation translation apparatus for providing at least one user terminal with a user interface for enabling a user to translate a language used in content data showing a scene on a display unit including an image and visible text, and to enter the translation of the language used in the content data in the user interface, the content data including a plurality of layers combining to form the scene, the apparatus comprising:
   a processor including a plurality of functional units for performing corresponding predetermined functions, the plurality of functional units including:
   a content registration unit for registering on a database an original of content data received from a content data creator, wherein the content data includes visible text data and image data which are stored separately in different layers in the original of the content data, and the visible text data includes a plurality of predetermined unit texts;
   a data selection unit for individually selecting the visible text data and the image data included in either the original of the content data or a translation of the content data in which a translation is added to the original of the content data, wherein the visible text data and the image data are separated without having to additionally use an image editing program or a character recognition program;
   a translations editor providing unit for providing at least one user terminal with a translations editor, wherein the translations editor includes
      a content data display unit configured to display the plurality of unit texts of the visible text data and the image data on the display unit of the user terminal, and
      a text data editor unit in which the plurality of unit texts are reproduced from the content data display unit and displayed separately from each other, on the display unit of the user terminal, and in which text input units configured to receive, from a user, a translation of the plurality of unit texts are displayed separately from each other and from corresponding each unit text displayed on the display unit of the user terminal; and
   a content storage unit for receiving a second-language text which is input from the at least one user terminal via the translations editor, and storing the text data, the image data, and the received second-language text as the translation of the content data;
   wherein the content data display unit is displayed in a first area of the display unit simultaneously with the text data editor unit which is displayed in a second area of the display unit, so that the plurality of unit texts and the image data in the content data display unit and the plurality of unit texts in the text data editor unit are visible to the user before the user inputs the translation of the plurality of unit texts in the text input units of the text data editor unit, and
   wherein the translation of the plurality of unit texts input in the text input units is displayed in the content data display unit in place of the plurality of unit texts, and the plurality of unit texts reproduced from the content data display unit and the text input units are displayed in the text data editor unit simultaneously with the translation of the plurality of unit texts and the image data displayed in the content data display unit after receiving the translation of the plurality of unit texts which the user has input in the text input units of the text data editor unit.

2. The content participation translation apparatus of claim 1, wherein the text data included in the original of the content data comprises only a first-language text.

3. The content participation translation apparatus of claim 2, wherein the content storage unit stores, as the translation of the content data, the image data, the first-language text, and the at least one second-language text received from the at least one user terminal.

4. The content participation translation apparatus of claim 1, wherein the plurality of functional units of the processor further comprises a team management unit for managing generation and deletion of a translation team and joining and withdrawal of members of the translation team, and
   wherein the team management unit assigns a right to participate in translating a content to members of a preset translation team.

5. The content participation translation apparatus of claim 1, wherein the plurality of functional units of the processor further comprises a translation evaluation unit for evaluating the user of the user terminal, based on at least one among a number of sentences translated by the user, a number of times the user visits a participation translation site, a number of times the user views other users' translations, and the number of followers of the user.

6. A content participation translation method for providing at least one user terminal with a user interface for enabling a user to translate a language using a processor including a plurality of functional units for performing corresponding predetermined functions, the language being used in content data showing a scene on a display unit including an image and visible text, and to enter the translation of the language used in the content data in the user interface, the content data including a plurality of layers combining to form the scene, the method comprising:
   registering an original of content data received from a content data creator with a content participation translation apparatus, performed by a content registration unit, wherein the content data includes visible text data and image data which are stored in different layers in the original of the content data, and the visible text data includes a plurality of predetermined unit texts;
   individually selecting the visible text data and the image data included in either the original of the content data or a translation of the content data in which a translation is added to the original of the content data, performed by a data selection unit, wherein the visible text data and the image data are separated without having to additionally use an image editing program or a character recognition program;
   providing, by a translations editor providing unit, at least one user terminal with a translations editor including a content data display unit configured to display the plurality of unit texts of the visible text data and the image data on the display unit of the user terminal and a text data editor in which the plurality of unit texts are reproduced from the content data display unit and displayed separately from each other on the display unit of the user terminal, and in which text input units configured to receive, from a user, a translation of the plurality of unit texts are displayed separately from each other and from corresponding each unit text displayed on the display unit of the user terminal; and receiving a second-language text which is input by the user from the at least one user terminal via the translations editor, and storing the text data, the image data, and the received second-language text as the translation of the content data, performed by a content storage unit;

wherein the content data display unit is displayed in a first area of the display unit simultaneously with the text data editor unit which is displayed in a second area of the display unit, so that the plurality of unit texts and the image data in the content data display unit and the plurality of unit texts in the text data editor unit are visible to the user before the user inputs the translation of the plurality of unit texts in the text input units of the text data editor unit, and wherein the translation of the plurality of unit texts input in the text input units is displayed in the content data display unit in place of the plurality of unit texts, and the plurality of unit texts reproduced from the content data display unit and the text input units are displayed in the text data editor unit simultaneously with the translation of the plurality of unit texts and the image data displayed in the content data display unit after receiving the translation of the plurality of unit texts which the user has input in the text input units of the text data editor unit.

7. The content participation translation method of claim 6, wherein the text data included in the original of the content data comprises only a first-language text.

8. The content participation translation method of claim 7, wherein the storing of the text data, the image data, and the received second-language text as the translation of the content data comprises storing, as the translation of the content data, the image data, the first-language text, and the at least one second-language text received from the at least one user terminal.

9. The content participation translation method of claim 6, further comprising managing generation and deletion of a translation team and joining and withdrawal of members of the translation team, performed by a team management unit, wherein the team management unit assigns a right to participate in translating a content to members of a preset translation team.

10. The content participation translation method of claim 6, further comprising evaluating the user of the at least one user terminal, based on at least one among a number of sentences translated by the user, a number of times the user visits a participation translation site, a number of times the user views other users' translations, and the number of followers of the user, performed by a translation evaluation unit.

11. A non-transitory computer readable recording media storing a computer program for providing at least one user terminal with a user interface for enabling a user to translate a language used in content data showing a scene on a display unit including an image and visible text, and to enter the translation of the language used in the content data in the user interface, the content data including a plurality of layers combining to form the scene, said program, when executed by a processor including a plurality of functional units for executing corresponding predetermined functions, performing the steps comprising:

registering an original of content data received from a content data creator with a content participation translation apparatus, performed by a content registration unit, wherein the content data includes visible text data and image data which are stored in different layers in the original of the content data, and the visible text data includes a plurality of predetermined unit texts;

individually selecting the visible text data and the image data included in either the original of the content data or a translation of the content data in which a translation is added to the original of the content data, performed by a data selection unit, wherein the visible text data and the image data are separated without having to additionally use an image editing program or a character recognition program;

providing, by a translations editor providing unit, at least one user terminal with a translations editor including a content data display unit configured to display the plurality of unit texts of the visible text data and the image data on the display unit of the user terminal and a text data editor in which the plurality of unit texts are reproduced from the content data display unit and displayed separately from each other on the display unit of the user terminal, and in which text input units configured to receive, from a user, a translation of the plurality of unit texts are displayed separately from each other and from corresponding each unit text displayed on the display unit of the user terminal; and receiving a second-language text which is input by the user from the at least one user terminal via the translations editor, and storing the text data, the image data, and the received second-language text as the translation of the content data, performed by a content storage unit;

wherein the content data display unit is displayed in a first area of the display unit simultaneously with the text data editor unit which is displayed in a second area of the display unit, so that the plurality of unit texts and the image data in the content data display unit and the plurality of unit texts in the text data editor unit are visible to the user before the user inputs the translation of the plurality of unit texts in the text input units of the text data editor unit, and wherein the translation of the plurality of unit texts input in the text input units is displayed in the content data display unit in place of the plurality of unit texts, and the plurality of unit texts reproduced from the content data display unit and the text input units are displayed in the text data editor unit simultaneously with the translation of the plurality of unit texts and the image data displayed in the content data display unit after receiving the translation of the plurality of unit texts which the user has input in the text input units of the text data editor unit.

\* \* \* \* \*